March 15, 1955  J. B. GLENNON ET AL  2,704,030
ARMING AND FIRING CONTROL MECHANISM FOR A MARINE MINE
Filed Sept. 12, 1942  15 Sheets-Sheet 1

Inventors
J. B. GLENNON
R. W. WALLACE

Inventors
J. B. GLENNON
R. W. WALLACE

Attorney

March 15, 1955   J. B. GLENNON ET AL   2,704,030
ARMING AND FIRING CONTROL MECHANISM FOR A MARINE MINE
Filed Sept. 12, 1942   15 Sheets-Sheet 5

Inventors
J. B. GLENNON
R. W. WALLACE
Attorney

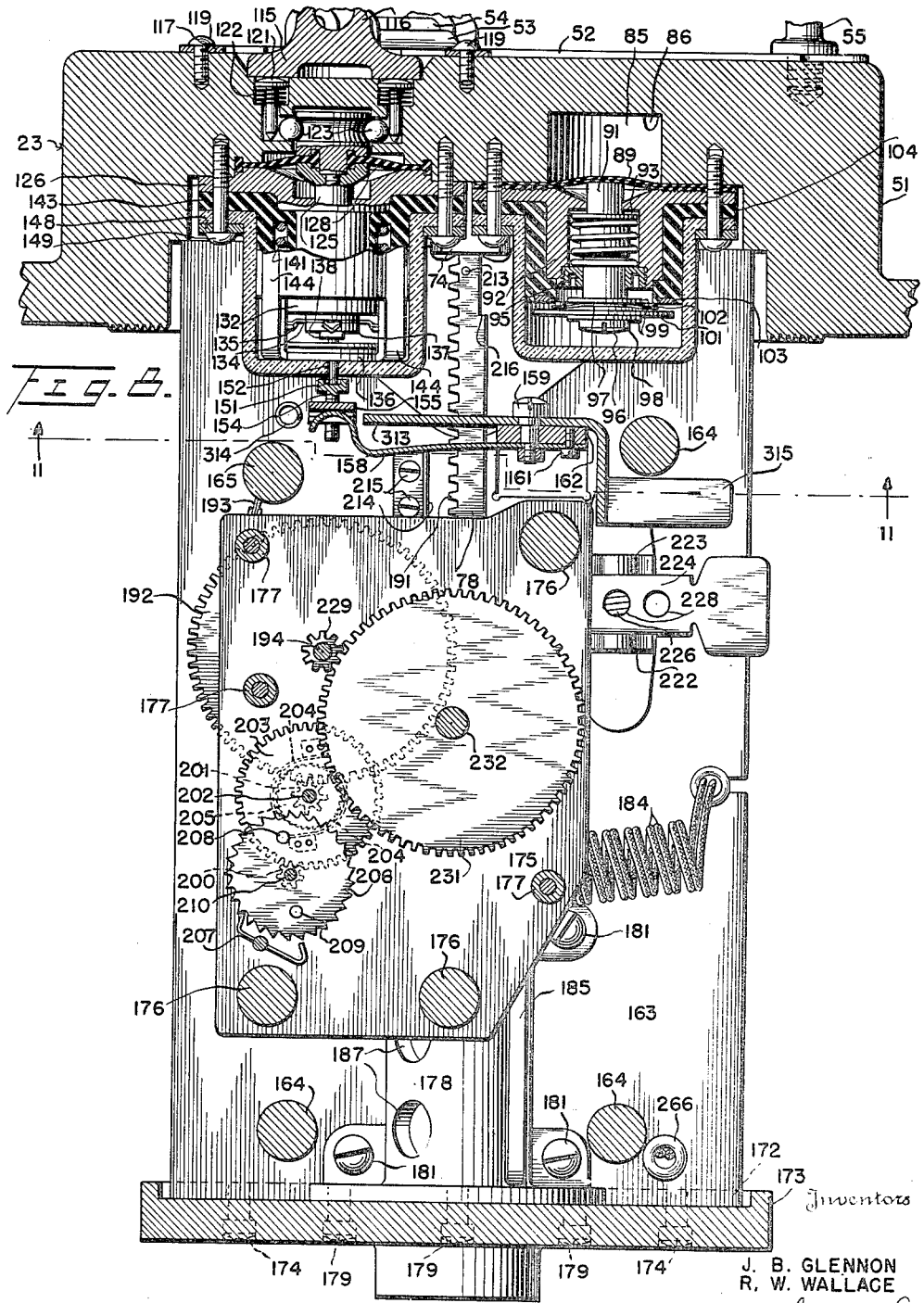

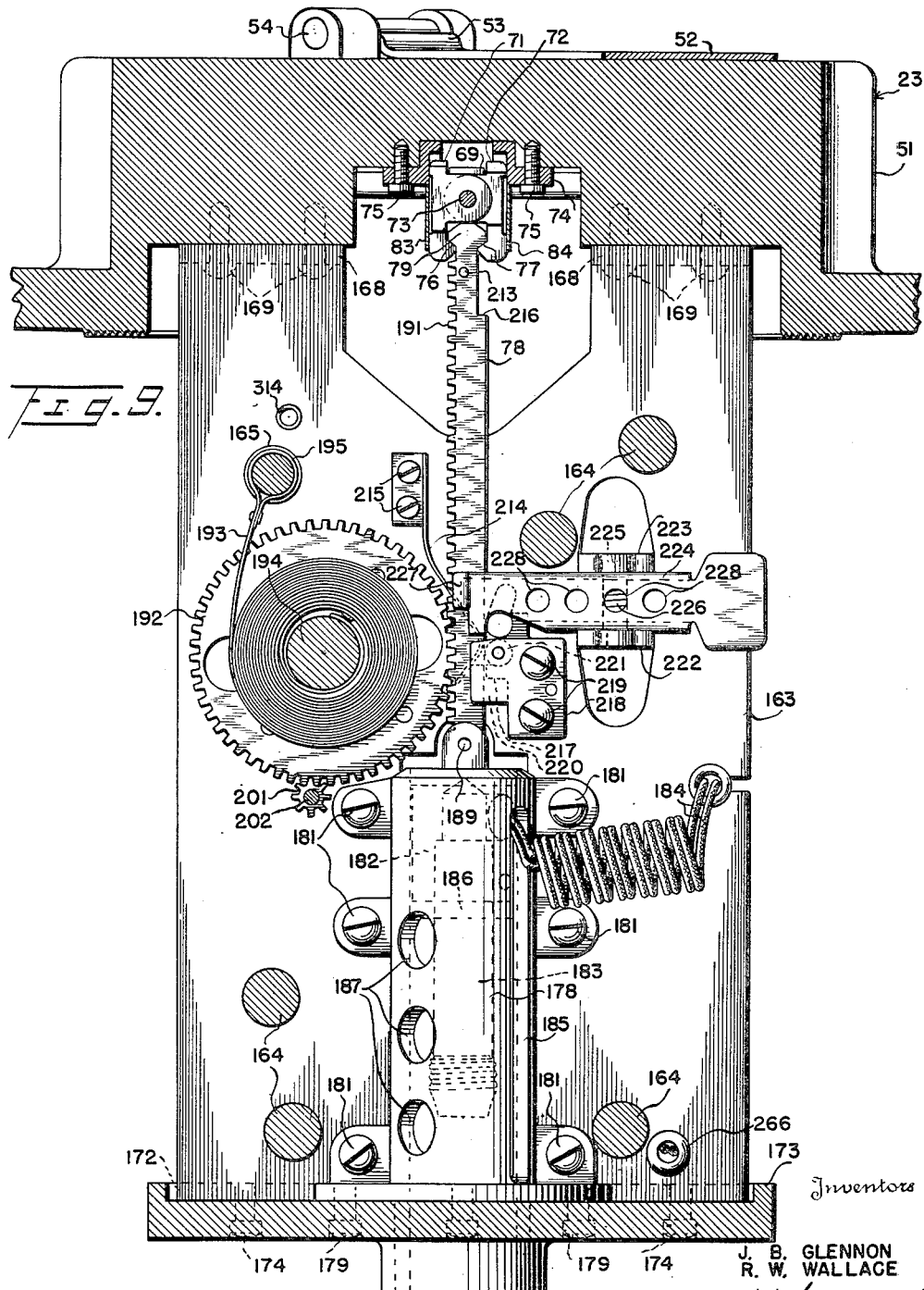

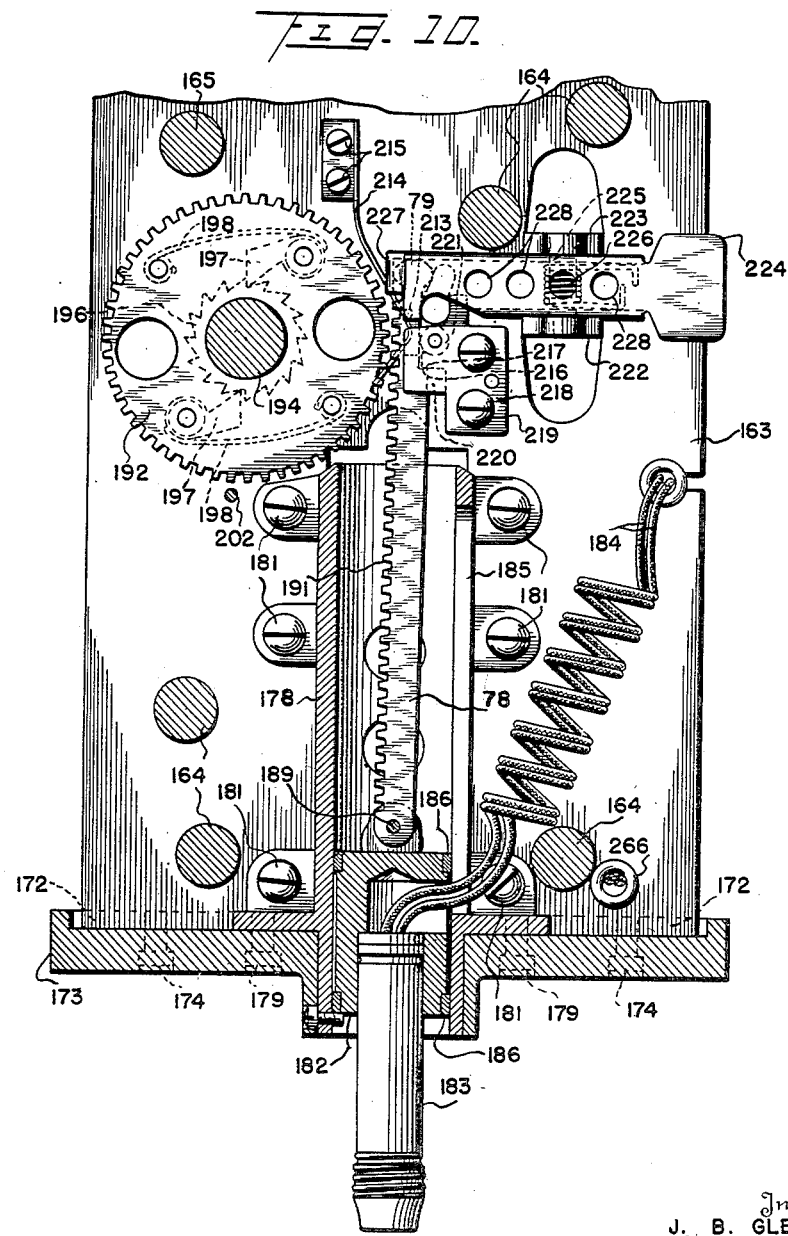

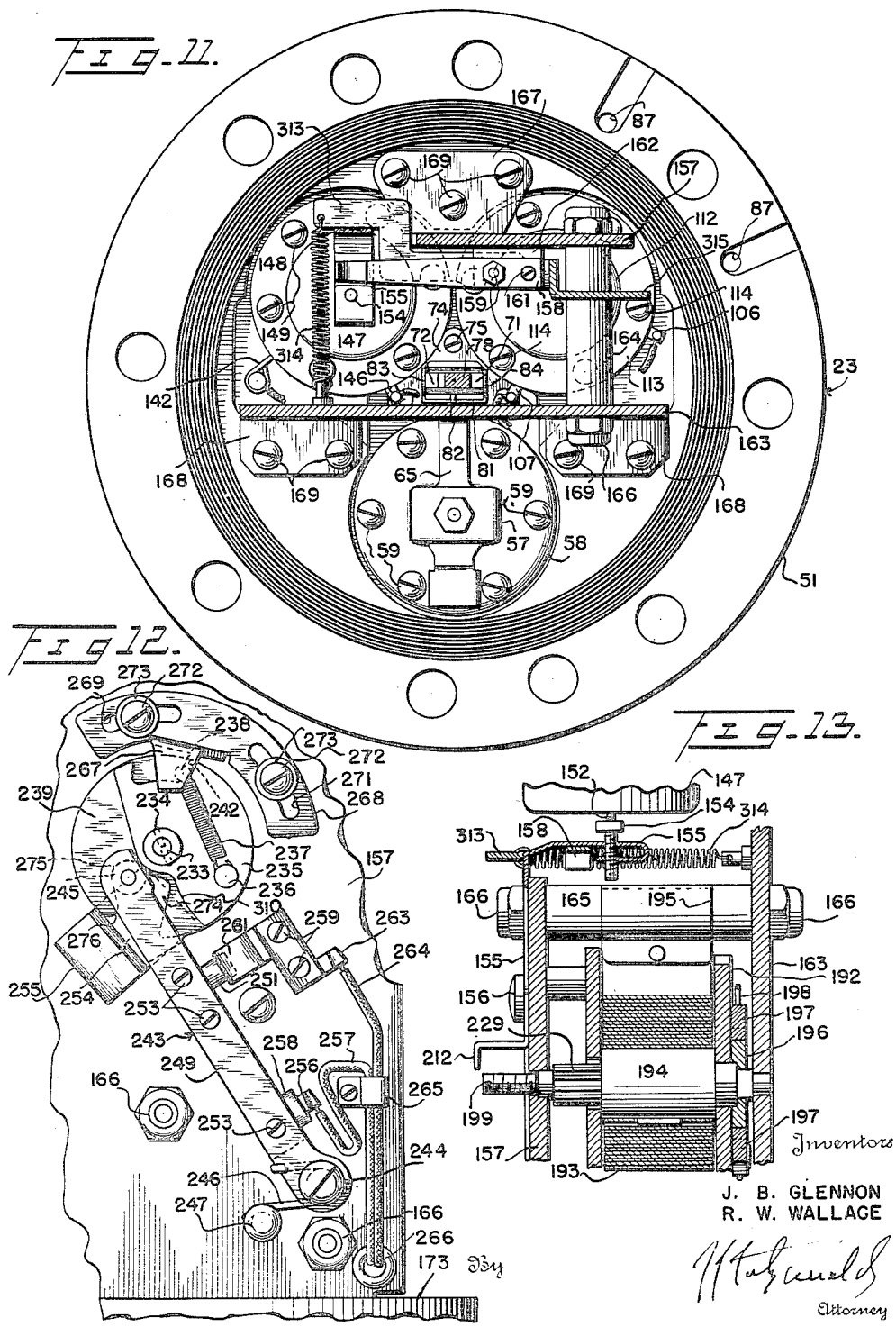

Inventors
J. B GLENNON
R. W. WALLACE

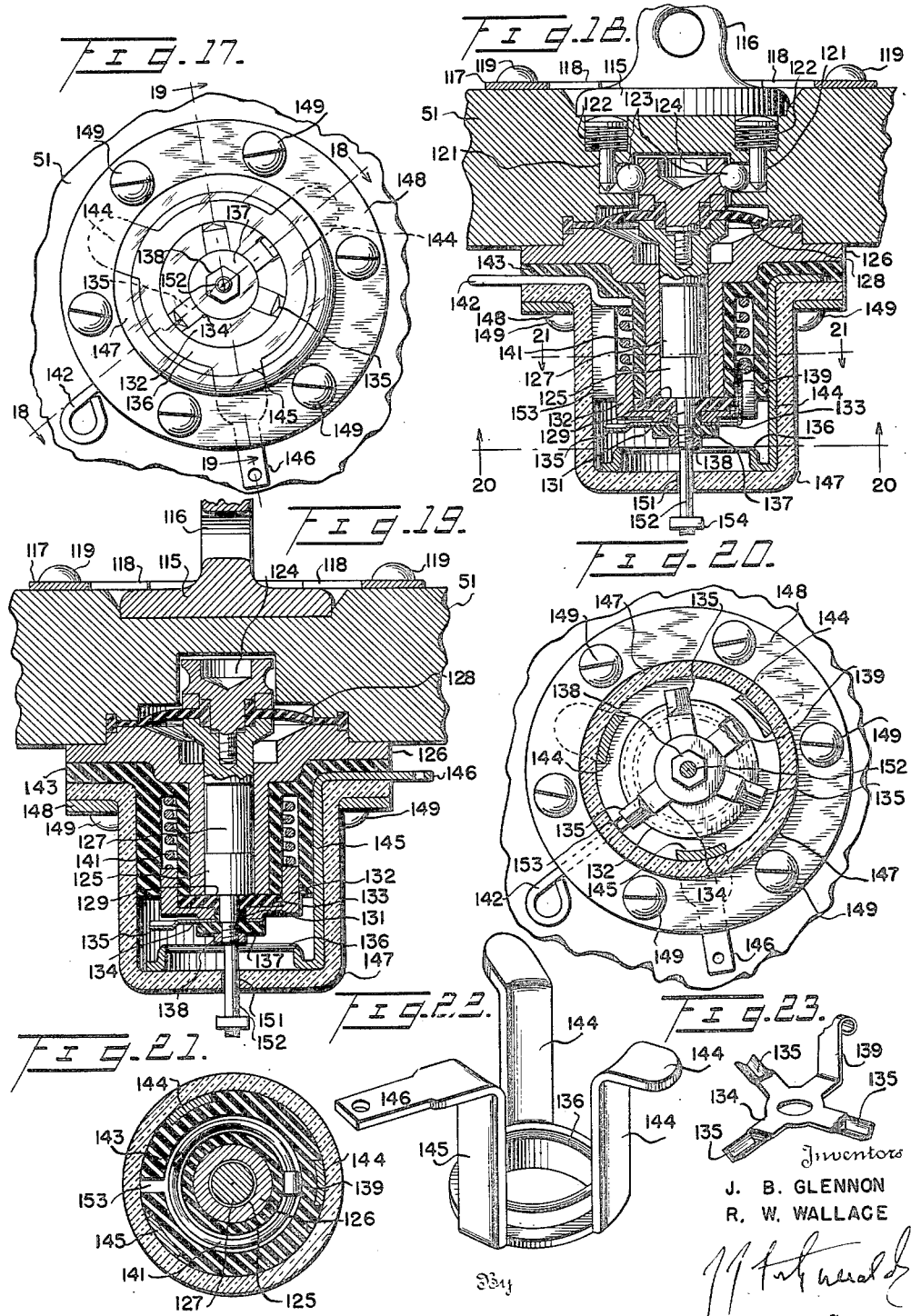

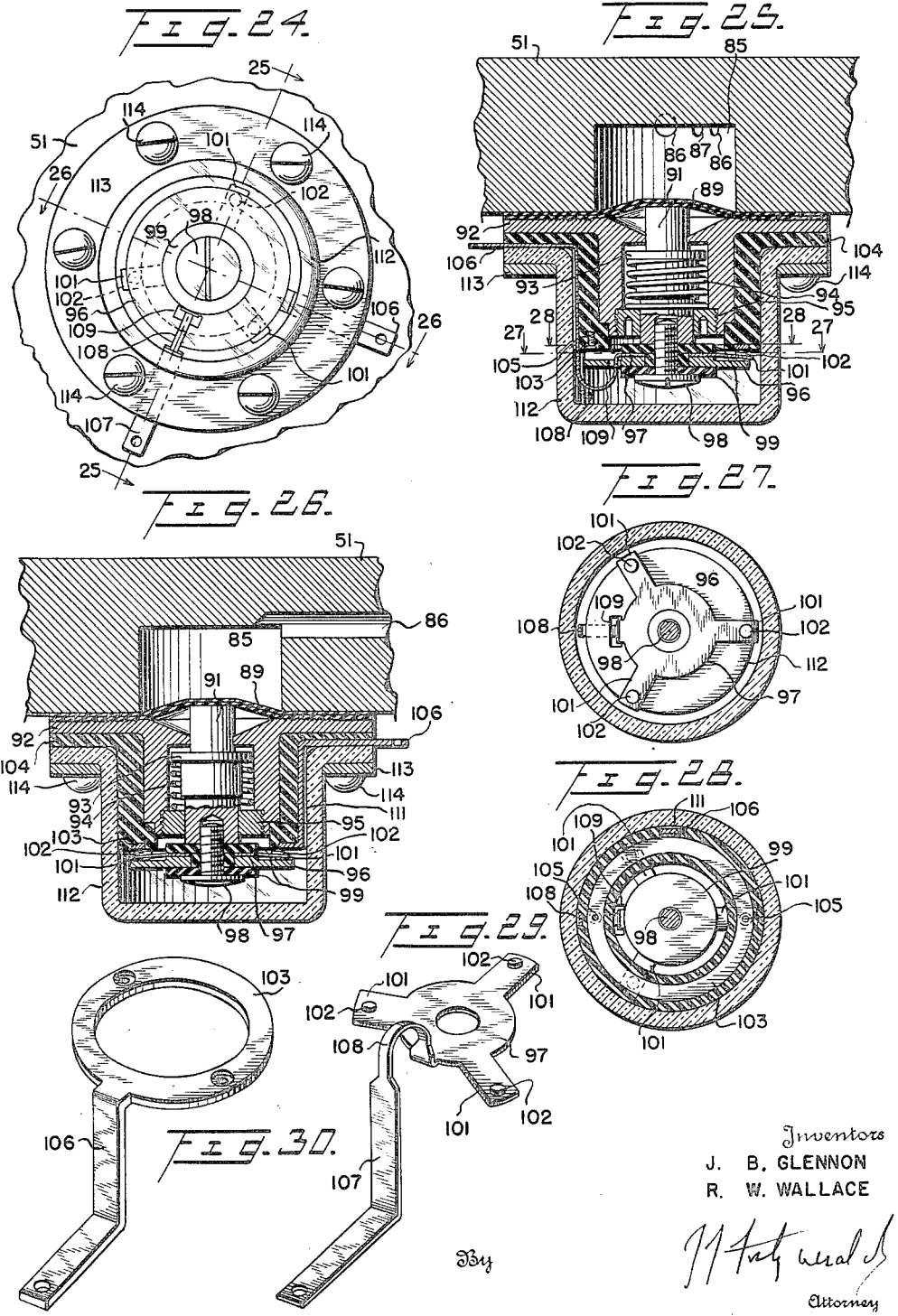

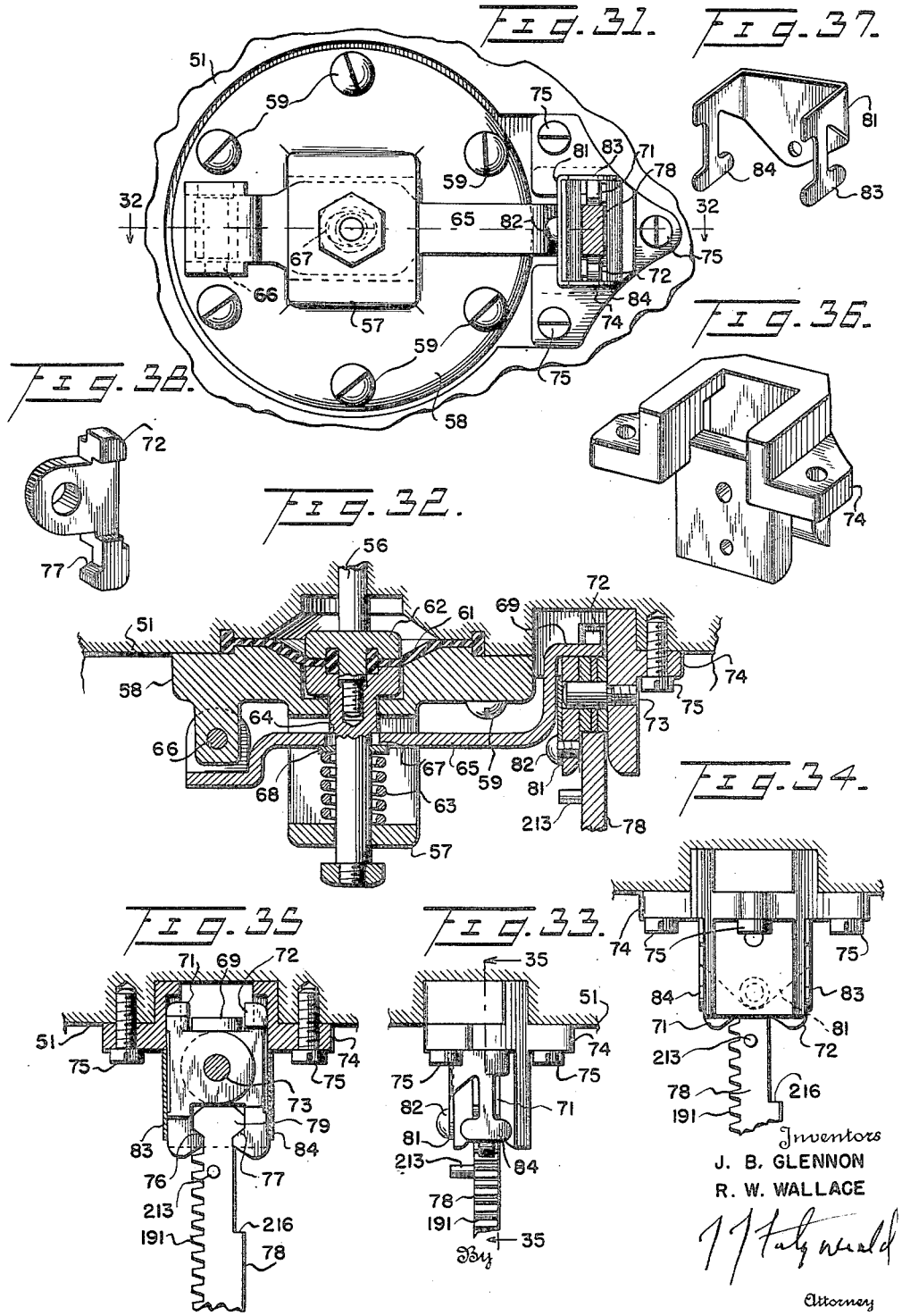

March 15, 1955  J. B. GLENNON ET AL  2,704,030
ARMING AND FIRING CONTROL MECHANISM FOR A MARINE MINE
Filed Sept. 12, 1942  15 Sheets-Sheet 14
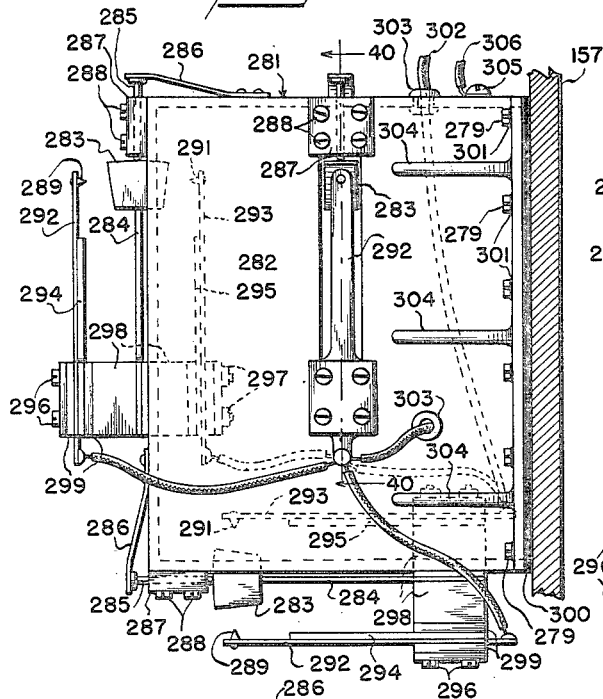
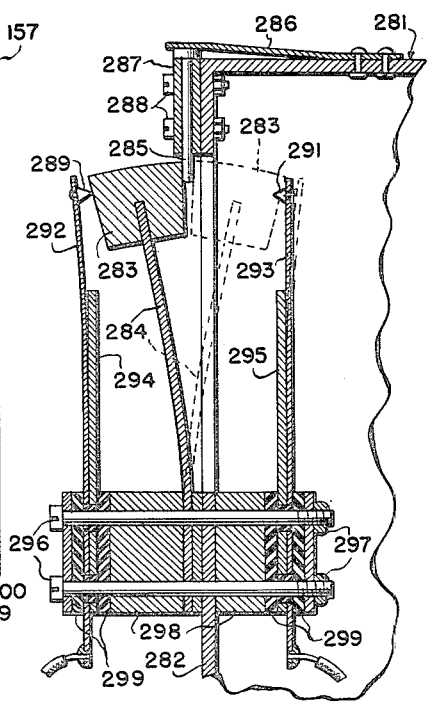
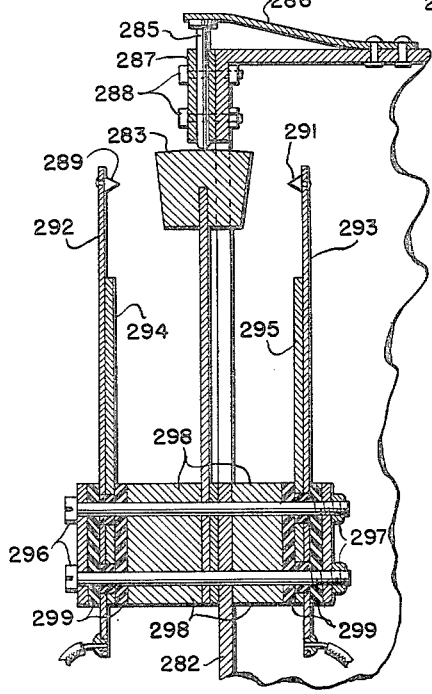
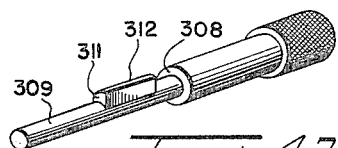
Inventors
J. B. GLENNON
R. W. WALLACE
Attorney

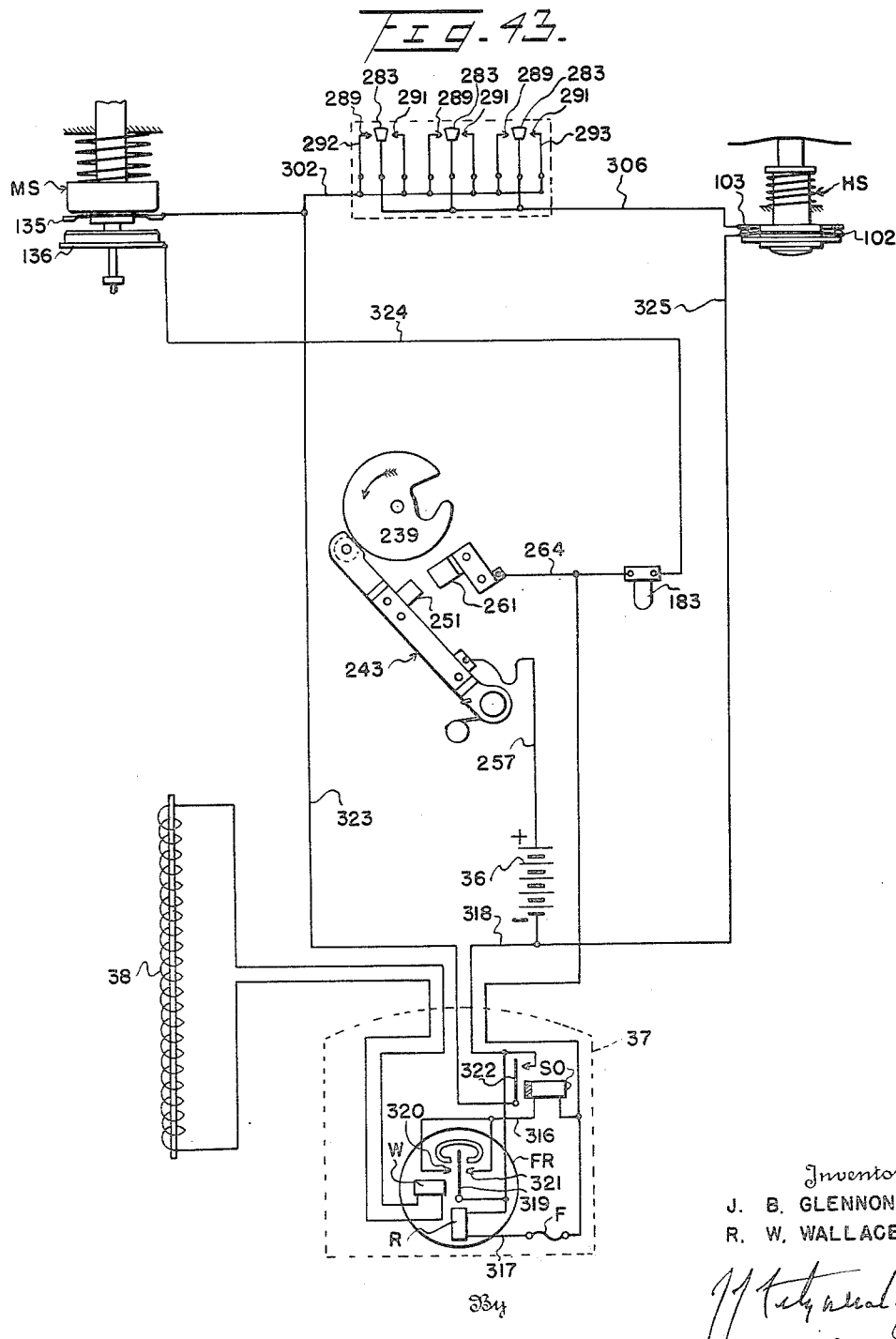

United States Patent Office 2,704,030
Patented Mar. 15, 1955

2,704,030

ARMING AND FIRING CONTROL MECHANISM FOR A MARINE MINE

James B. Glennon, United States Navy, and Roger W. Wallace, Washington, D. C.

Application September 12, 1942, Serial No. 458,146

29 Claims. (Cl. 102—16)

(Granted under Title 35, U. S. Code (1952), sec. 266)

This invention relates to mechanism for arming and controlling the firing of a marine mine of the type adapted to be planted within a body of water from an aircraft in flight. More specifically, the invention relates to an arming and firing mechanism for a marine mine in which new and improved means are employed to extend the detonator within the explosive charge in response to the release of the mine from the aircraft, and in which the mechanism is adapted to close a pair of contacts after the detonator has been fully extended and thereby arm the mine within a predetermined period of time after the mine has been released in the event that the mine lands within a body of water of sufficient depth to actuate a hydrostat element, means also being included within the mechanism for causing the mine to explode in the event that the mine lands on terra firma or within a body of water of insufficient depth to actuate the aforesaid hydrostat.

Various devices and arrangements have heretofore been devised for arming a mine and for extending the detonator into operative position with respect to the explosive charge. In these arrangements it is the usual practice to employ the pressure of the water within which the mine is launched for actuating the detonator to the extended position and to arm the mine under control of a separate arming mechanism. Such arrangements depend for their successful operation upon the establishment of certain electrical connections therebetween which are completed during the assembly of the mine and the mine may, therefore, be rendered fully or in part ineffective by carelessness or inadvertence on the part of the workers during the assembly of the mine in failing to establish the proper connection between the various elements.

In the device of the present invention the electrical and mechanical connections between the various elements thereof may be established and the device tested before the device is assembled within the casing of the mine and, for this reason, there is less probability of failure of the mine as the result of improper connections resulting from carelessness of the personnel assembling the same. Furthermore, the various control elements for extending the detonator within the explosive charge and thereafter closing an arming circuit are incorporated in a unitary structure such that the various elements of the structure and the coaction therebetween may be thoroughly tested for operation before the mechanism is assembled within the casing of the mine.

In the device of the present invention a single detachable unit is provided in which the mine is rendered absolutely safe prior to the launching thereof by reason of the provision of certain detachable safety devices including an arming plug secured to an arming wire and a detachable arming lever which are required to be removed before the mechanism is started through the arming cycle thereof. The removal of the arming lever as the mine falls away from the aircraft causes the detonator to be unlocked from the fully retracted position thereof and the removal of the arming plug causes the spring driven mechanism to be set into operation to extend the detonator within the explosive charge. When the detonator is fully extended, the detonator is disconnected from the escapement mechanism whereby the escapement mechanism continues to operate and close an arming circuit in time delayed relation with respect to the insertion of the detonator within the explosive charge.

The disengagement of the arming plug from the device by the arming wire also causes a pair of contact elements to be brought into engagement with each other thereby completing an electrical connection between the firing circuit and one terminal of the electro-responsive detonating element. When the arming circuit is closed by the clock escapement mechanism aforesaid, the mine is at rest on the bed of a body of water in an armed condition provided the water is of a predetermined depth.

In the event, however, that the mine should be dropped upon the land or within a body of water of insufficient depth to actuate a hydrostat mechanism arranged within the device, a firing circuit is closed by the contacts of an arming switch controlled by the escapement mechanism thereby firing the mine, the firing circuit including the contacts of an inertia switch adapted to be closed by the shock or impact of the mine against the land or the surface of the water, as the case may be. The contacts of the inertia switch, it will be understood, are normally open prior to the launching of the mine and brought into electrical engagement with each other only in response to a severe blow or brutal shock such as the mine receives upon striking the land or the body of water when dropped from a considerable height such, for example, as the flying altitude of an aircraft. By providing an inertia switch in the manner herein disclosed, the premature denotation of the mine as the result of accident or improper handling such, for example, as the accidental removal of the plug associated with the arming wire therefrom before the mine is released from the aircraft in flight is prevented by reason of the fact that any blows or shocks to which the mine may be subjected during the manufacture, transportation and handling thereof are insufficient to cause the contacts of the inertia switch to be moved to the closed position.

There are also included within the structure of the device certain elements and features of design and construction whereby the mechanism may be caused to perform as many cycles of operation as may be desired during the adjustment and test of the mechanism. The details of these elements and features and the manner in which these elements are employed will be more clearly apparent as the description proceeds.

One of the objects of the present invention is the provision of new and improved means for extending a detonator within the explosive charge of a mine.

Another of the objects is the provision of new and improved means for locking the detonator in a retracted position until the cycle of arming operations has started.

Another object is to provide a detonator extending mechanism having a pair of electrical contacts adapted to be closed in time delayed relation with respect to the completion of the movement of the detonator within the explosive charge.

Another object is the provision of new and improved means for extending the detonator within an explosive charge and locking the detonator in the extended position.

Another object is the provision of new and improved means for starting a detonator extending mechanism in operation and closing a pair of electrical contact elements as the starting means operates.

Another object is the provision of new and improved means for firing the mine selectively in accordance with the degree of pressure of the water within which the mine is planted.

Still another object is to provide new and improved means for preventing the recovery of the mine when planted within a body of water of greater than a predetermined depth.

A further object is the provision of means controlled by the degree of shock to which the mine is subjected for preventing premature firing of the mine prior to the release of the mine from an aircraft.

A still further object consists in the features of the design, construction, combination of parts and in the unique relations of the members and in the relative proportioning and disposition thereof; all as more completely outlined herein.

Still other objects, advantages and improvements will be apparent from the following description taken in connection with the accompanying drawings in which like numerals of reference are employed throughout the several views to designate like parts and in which:

Fig. 8 is a sectional view taken substantially along the line 8—8 of Fig. 7;

Fig. 9 is a sectional view taken substantially along the line 9—9 of Fig. 7;

Fig. 10 is a fragmentary view in section similar to Fig. 9 showing the detonating device locked in an extended position;

Fig. 11 is a sectional view taken substantially along the line 11—11 of Fig. 8;

Fig. 12 is a fragmentary view of the switch mechanism of Fig. 3 with the switch arm locked in a closed position;

Fig. 13 is a fragmentary view taken along the line 13—13 of Fig. 3;

Fig. 17 is a plan view of the master switch mechanism;

Fig. 18 is a view in section taken substantially along the line 18—18 of Fig. 17;

Fig. 19 is a view in section taken substantially along the line 19—19 of Fig. 17;

Fig. 20 is a sectional view taken substantially along the line 20—20 of Fig. 18;

Fig. 21 is a view taken substantially along the line 21—21 of Fig. 18;

Fig. 22 is a detail view in perspective of the contact ring of the master switch;

Fig. 23 is a perspective view of the contact member of the master switch;

Fig. 24 is a plan view of a hydrostat switch suitable for use with the present device;

Fig. 25 is a view taken along the line 25—25 of Fig. 24;

Fig. 26 is a view taken along the line 26—26 of Fig. 24;

Fig. 27 is a sectional view taken along the line 27—27 of Fig. 25;

Fig. 28 is a sectional view taken along the line 28—28 of Fig. 25;

Fig. 29 is a detail perspective view of one of the contact members employed with the hydrostat switch;

Fig. 30 is a detail perspective view of the contact ring of the hydrostat switch;

Fig. 31 is a detail plan view of the safety device and associated locking mechanism;

Fig. 32 is a detail sectional view taken along the line 32—32 of Fig. 31;

Fig. 33 is a detail side view of the rack locking mechanism and supporting means therefor;

Fig. 34 is a detail front view of the parts shown in Fig. 33;

Fig. 35 is a detail sectional view taken substantially along the line 35—35 of Fig. 33;

Fig. 36 is a perspective view of the bracket for supporting the locking mechanism;

Fig. 37 is a perspective view of the spring member employed with the locking mechanism;

Fig. 38 is a perspective view of one of the lock members;

Fig. 39 is a greatly enlarged view in elevation of an inertia switch;

Fig. 40 is a fragmentary sectional view taken substantially along the line 40—40 of Fig. 39;

Fig. 41 is a view similar to Fig. 40 showing the switch in a closed and locked position;

Fig. 42 is a view in perspective of a resetting key suitable for use with the device of the present invention; and Fig. 43 shows in diagrammatic form a circuit arrangement of the entire system.

Figure 1:
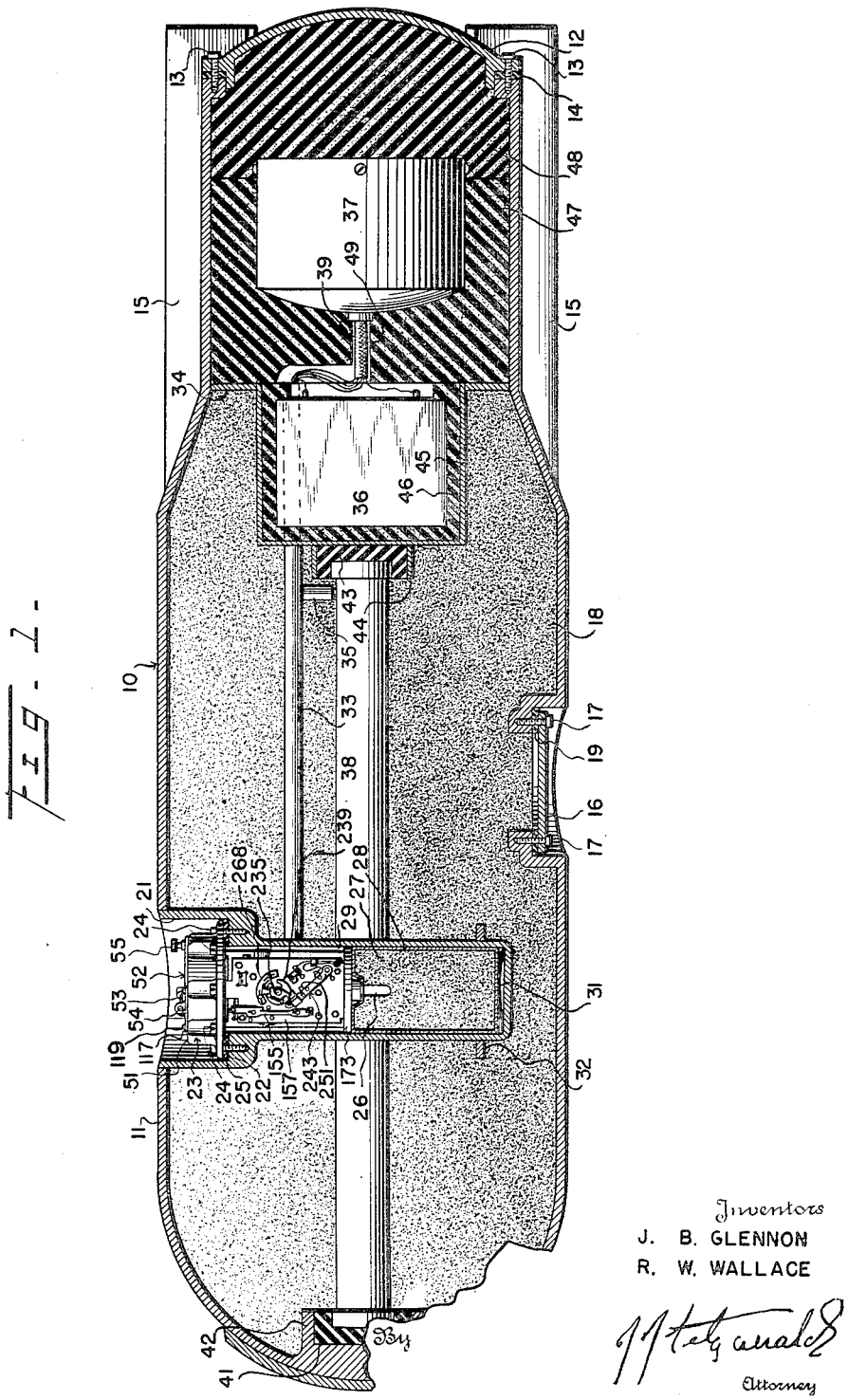
Fig. 1 is a longitudinal sectional view taken substantially centrally through a mine employing the device of the present invention.

Referring now to the drawings and more particularly to Fig. 1 thereof there is shown thereon a marine mine indicated generally by the numeral 10 comprising a casing 11 adapted to be sealed by the cap 12 secured thereto as by the bolts 13, a gasket 14 being provided preferably to insure a watertight connection between the cap and the casing. The mine is provided with a plurality of fins 15 adapted to guide the mine along a predetermined line or path of travel as the mine is launched from an attacking craft. The mine is also provided with a cover 16 secured to the casing of the mine as by the bolts 17 thereby to close an aperture through which an explosive charge 18 of TNT or the like may be introduced within the casing. A gasket 19 is preferably assembled beneath the cover 16 to prevent leakage or seepage of water within the mine.

The mine is provided with a well 21 having a shoulder 22 adapted to support the arming and firing control mechanism 23 secured thereto as by the bolts 24, a gasket 25 being employed preferably between the control mechanism and the shoulder to effect a watertight connection therebetween. The firing control and arming mechanism 23 is adapted to extend a detonating device into a suitable recess 26 within an explosive booster charge 27 arranged within a container 28 adapted to fit within the recess 29 comprising the lower portion of the well 21, a resilient member 31 being preferably provided within the bottom of the well to urge the container continuously against the arming mechanism 23. The recessed member 29 is preferably braced to the casing of the mine as by the member 32 thereby additionally to support the recessed member and prevent damage or injury thereto as the result of the violent shock which is received as the mine strikes the surface of a body of water or lands on terra firma, as the case may be. There is also provided within the casing of the mine a tubular member or cable duct 33 extending between the well 21 and a partition 34, the tubular member having a branch 35 thereon thus providing an arrangement in which an electrical circuit is established between the arming control mechanism 23, a battery 36, the mine firing mechanism 37 and an induction coil 38 by means of the conductors within the cable 39 arranged therein.

The induction coil 38 comprises a rod or bar of magnetic material suitable for the purpose such, for example, as a material having a composition of substantially 78½ percent nickel and 21½ percent iron, about which is arranged a winding having the ends thereof externally connected to the firing mechanism 37 by a pair of conductors within the cable 39. The induction coil 38 is supported at one end by the resilient bushing 41 arranged within the well 42 and at the other end thereof by the resilient bushing 43 arranged within the well 44 secured to the casing 45 within which the battery 36 is arranged. The battery is preferably supported by a resilient pad or cushion 46 arranged within the casing 45 thereby to prevent damage or injury to the battery as the mine is launched. The mine firing mechanism 37 is supported by the resilient cushions or pads 47 and 48 arranged within the tail of the mine and maintained in the assembled position thereof by the cap 12, the pad 47 having an aperture 49 therein of sufficient size to receive the cable 39.

The firing mechanism 37 may be of any type suitable for the purpose in which a firing circuit from battery 36 to the detonator is closed in response to signals picked up by the induction coil 38 such, for example, as the firing mechanism disclosed and claimed in the copending application of James B. Glennon et al. for Mine Firing Mechanism, Serial No. 406,236, filed August 9, 1941.

The arming and firing control mechanism 23 is supported by a cap 51 to which is affixed a detachable bar 52, Figs. 2 to 5, having one end formed as at 53 to engage the pin 54 and be retained thereby and provided at the opposite end thereof with an aperture adapted to receive the safety screw 55 threaded within the cap 51 thereby providing an arrangement in which the bar 52 is maintained in the position shown on the drawings by the pin 54 and safety screw until the mine has been placed in position on the aircraft, the bar being securely held in the assembled position by the pin 54 and a projecting member secured to the aircraft in abutting relation to the bar after the safety screw 55 has been removed. As the mine falls away from the aircraft the bar 52 is actuated outwardly by the plunger 56, Figs. 7 and 32, slideably arranged within the cap 51, the lower end of the plunger being slideably supported by the bracket 57 affixed to the plate 58. The plate 58 is clamped to the cap 51 as by the screws 59 thereby sealing the flexible diaphragm 61 at the outer portion thereof to the cap 51, the central portion of the flexible diaphragm being secured to the plunger 56 as by the member 62 whereby the plunger is adapted to be actuated by the spring 63 without the possibility of leakage of water past the plunger.

The member 62 is provided with a shoulder 64 in abutting relation with respect to the release arm 65 pivotally mounted as at 66, an elongated slot 67, Fig. 31, being provided within the arm 65 whereby pressure of the spring 63 against the washer 68 is adapted to move the arm 65 and the plunger rod 56 upwardly as the bar 52 moves outwardly from the cap 51. One end of the release arm 65 is formed as at 69 in such a manner as to be disposed between the upper ends of the lock members 71 and 72, Fig. 35, pivoted as at 73 within a bracket support 74 secured to the cap 51 as by the screw 75. The lower end of each of the lock members 71 and 72 is formed at an angle at 76 and 77 respectively and adapted to lock the extender rack 78 in the retracted position by reason of the enlarged portion 79 thereon with which the lower ends of the locked members 71 and 72 are engaged when the rack is in the fully retracted position. The lock members 71 and 72 are yieldably urged in a locking position by the spring member 81, Fig. 37, secured to the bracket support 74 by the screw 82 and provided with two resilient downwardly projecting portions 83 and 84 adapted to engage the lock members 71 and 72 respectively. The portions 83 and 84 of the spring member 81 are of insufficient strength to prevent the release of the rack 78 as the release arm 65 is moved upwardly to the released position by the spring 63.

Figure 4:
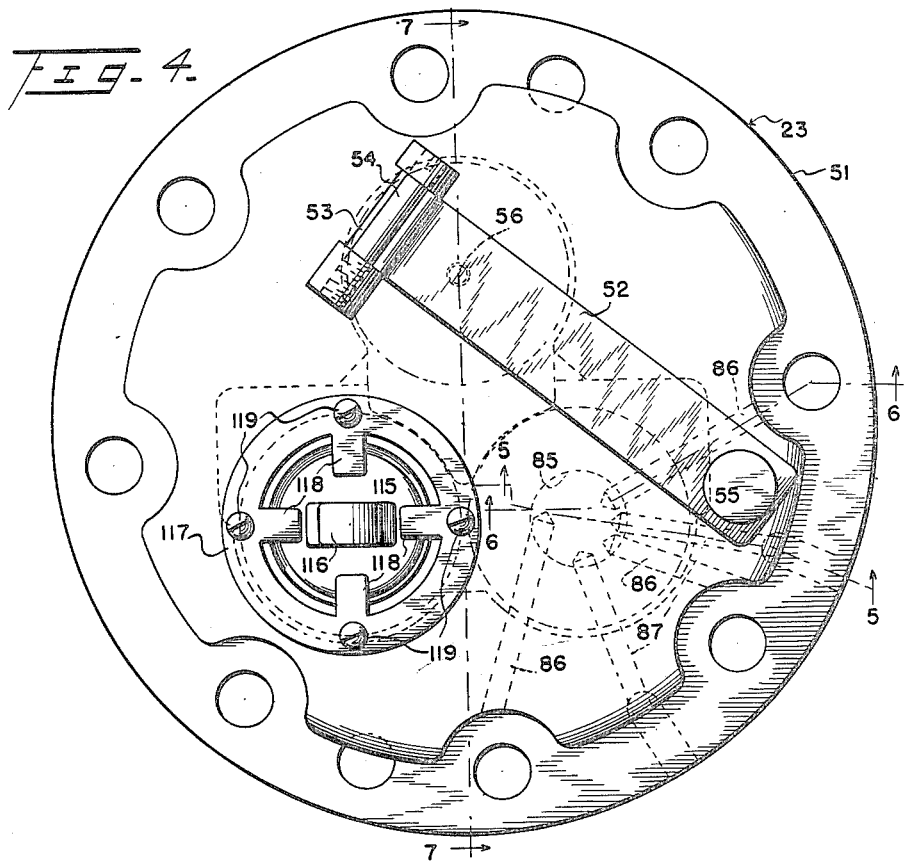
Fig. 4 is a plan view of the device.
Figure 5:
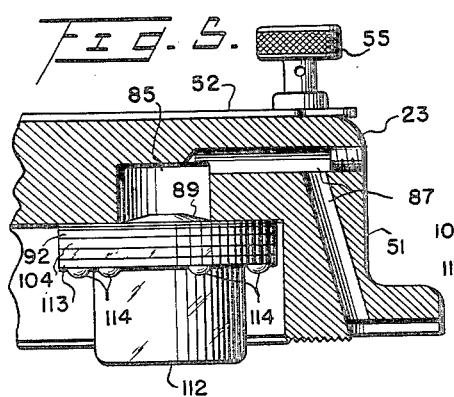
Fig. 5 is a fragmentary sectional view of the device taken substantially along the line 5—5 of Fig. 4.
Figure 6:
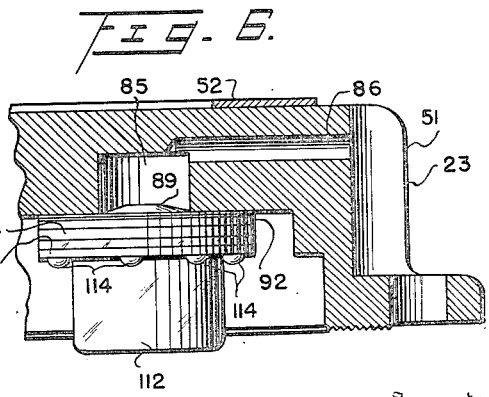
Fig. 6 is a fragmentary view taken substantially along the line 6—6 of Fig. 4.

There is also provided within the cap 51 a recessed portion or chamber 85 having a plurality of apertures 86 and 87, Figs. 4 and 25, extending therefrom to the outer portion of the cap 51 by means of which the sea water is allowed to enter the chamber 85 and actuate a flexible diaphragm 89 extending across the lower portion of the chamber and sealed to the cap 51 in the manner illustrated on the drawings. The flexible diaphragm is composed of any material suitable for the purpose but we prefer to employ a diaphragm composed of material known in the trade as vinyl chloride or the like. The diaphragm is adapted to actuate a plunger 91, Fig. 8, slideably mounted within the support 92 and provided with a shoulder 93 adapted to be engaged by one end of the spring 94, the other end of the spring abutting the cylindrical member 95 threaded within the support 92. The lower end of the plunger 91 is provided with a disk or washer 96 having a contact member 97 assembled thereagainst and retained in the assembled position by a screw 98, the disk 96 and contact member 97 being electrically insulated from the plunger 91 by suitable washers or bushings 99. The contact member 97 is provided with a plurality of contact arms 101, Figs. 27 and 29, extending radially therefrom and arranged such that the contacts 102 secured to the arms are normally disengaged from the contact ring 103 at all times except when the plunger 91 is actuated downwardly by the pressure of the water within the chamber 85.

The contact ring 103 is secured to a cup-shaped support 104 of suitable insulated material arranged about the support 92 as by the screws 105. The contact ring 103 includes a projecting portion 106, Figs. 26 and 30, extending therefrom for establishing an external circuit to the contact member. The contact member 97, it will be noted, includes a portion 107 being considerably reduced in cross section as at 108 thereby to provide a connection to the contact member of sufficient flexibility to enable the contact member to be actuated by the plunger 91 in response to pressure of the water against the flexible diaphragm 89. The disk 96 is provided with an aperture 109 through which the reduced portion 108 of the contact strip 107 extends thereby providing a compact structure in which the movement of the disk 96 is substantially unhindered by the contact or terminal strip 107. The insulated support 104 is provided with a grooved portion as at 111, Fig. 28, thereby to guide and support the terminal strip 106 in a predetermined position as the cup-shaped cover 112 is clamped in the assembled position by the retaining ring 113 and screws 114 threaded within the cap 51, the screws 114 also clamping the outer portion of the flexible diaphragm 89 securely against the cap 51. The cover 112 is composed preferably of transparent insulating material whereby the operation of the switch contact elements may be observed prior to installation of the hydrostat within the casing of the mine. The contact ring 103, contacts 102 and actuating mechanism therefor is referred to herein as a hydrostat switch, and the pressure of the spring 94 and the effective area of the diaphragm 89 coact to provide a hydrostatically controlled mechanism adapted to disengage the switch contacts thereof when the mine reaches a predetermined depth of submersion within the water.

There is also provided within the cap 51 a recess, Fig. 18, within which is arranged a disk shaped plug 115 having an eye 116 thereon to which an arming wire is adapted to be secured, the other end of the arming wire being attached to the aircraft in such a manner that the plug is forcibly removed from the cap 51 by the arming wire as the mine falls away from the aircraft. The plug 115 is releasably held in the assembled position with respect to the cap 51 by a retaining ring 117 having a plurality of projecting portions 118, Fig. 4, thereon in abutting relation with respect to the plug 115 and adapted to maintain the plug in the assembled position shown on the drawings until the mine is released, at which time the arming wire secured to the plate causes the plug to be jerked with a force sufficient to bend the projecting portions 118 outwardly and detach the plug from the cap 51. The retaining ring 117 is secured to the cap 51 in any suitable manner as by the screws 119.

When this occurs, the plungers 121 are forced outwardly by the springs 122 thereby releasing a pair of balls 123, Fig. 18, which move outwardly thereby unlocking the retaining member 124. The member 124, it will be understood, is threaded or otherwise secured to a plunger 125 slideably arranged within a support 126 and preferably relieved as at 127 to facilitate the sliding movement of the plunger within the support. A flexible diaphragm 128 is secured to the plunger 125 in the manner illustrated by clamping the outer portion thereof to the cap 51 by the support 126. The plunger 125 is provided with a shoulder 129 and a reduced cylindrical portion 131 about which is arranged a cup-shaped member 132 composed of suitable material such, for example, as brass and electrically insulated therefrom as by the insulating washer 133 in abutting relation with the shoulder 129 and supported by the plunger 125 at the reduced portion 131 thereof whereby the contact member 134 having a plurality of contacts 135 thereon is adapted to engage the contact ring 136 as the device operates. The contact member 134 is electrically insulated from the plunger rod 125 as by the insulating washer 137, the contact member and cup-shaped member 132 being securely clamped to the plunger as by the nut 138 threaded thereon. The contact member 134 is also provided with an arm 139 extending therefrom and arranged within a slot formed in the cup-shaped member 132. The upper end of the arm is secured to the resilient spring 141 at the lower end thereof, the upper end of the spring being formed as at 142 thereby to establish an external electrical connection to the contact member 134. The cup-shaped member 132 and spring 141 are arranged within an annular slot formed in an insulating spacing member 143, the spring 141 being compressed sufficiently to force the member 132 and plunger 125 secured thereto downwardly when the balls 123 are released by the plungers 121 and bring the contact member 134 into engagement with the contact ring 136.

The contact ring 136 is provided with a plurality of supporting arms 144 and 145, the arm 145 being extended outward radially as at 146 thereby to establish an external circuit connection to the contact ring 136. A suitable cover 147 preferably of transparent material is arranged about the spacing member 143 and clamped thereto as by the retaining ring 148 and screws 149 thereby providing an arrangement in which the screws 149 are also employed to clamp the flexible diaphragm 128 at the outer portion thereof to the cap 51. The cover 147 is provided with an aperture 151 at the lower central portion thereof through which the portion 152 of the plunger 125 is adapted to move. The spacing member 143, it will be understood, is provided with a slotted portion 153 within which the extending portion 142 of the spring 141 is arranged and a plurality of additionally grooved portions adapted to receive and support the arms 144 and 145 of the contact ring 136.

As the balls 123 are disengaged from the retaining member 124, the plunger 125 is moved downwardly by the spring 141 sufficiently for the contacts 135 to engage the contact ring 136 and thereby close a circuit between the arms 142 and 146 extending outwardly from the device. The elements comprising the contact members 134 and 136 are hereinafter referred to as a master switch. The flexible diaphragm 128, it will be noted, is employed to prevent the seepage of water past the plunger 125 and additionally to urge the contacts 135 into engagement with the contact ring 136 by the pressure of the water against the outer surface of the flexible diaphragm thereby providing an arrangement in which the pressure of the water may be employed to supplement the force of the spring 141 when the mine is planted within the water. It will be understood, however, that in the event that the mine should land upon terra firma the spring 141 is of sufficient strength to actuate the plunger sufficiently for contacts 135 to engage the contact ring 136.

Figure 3:
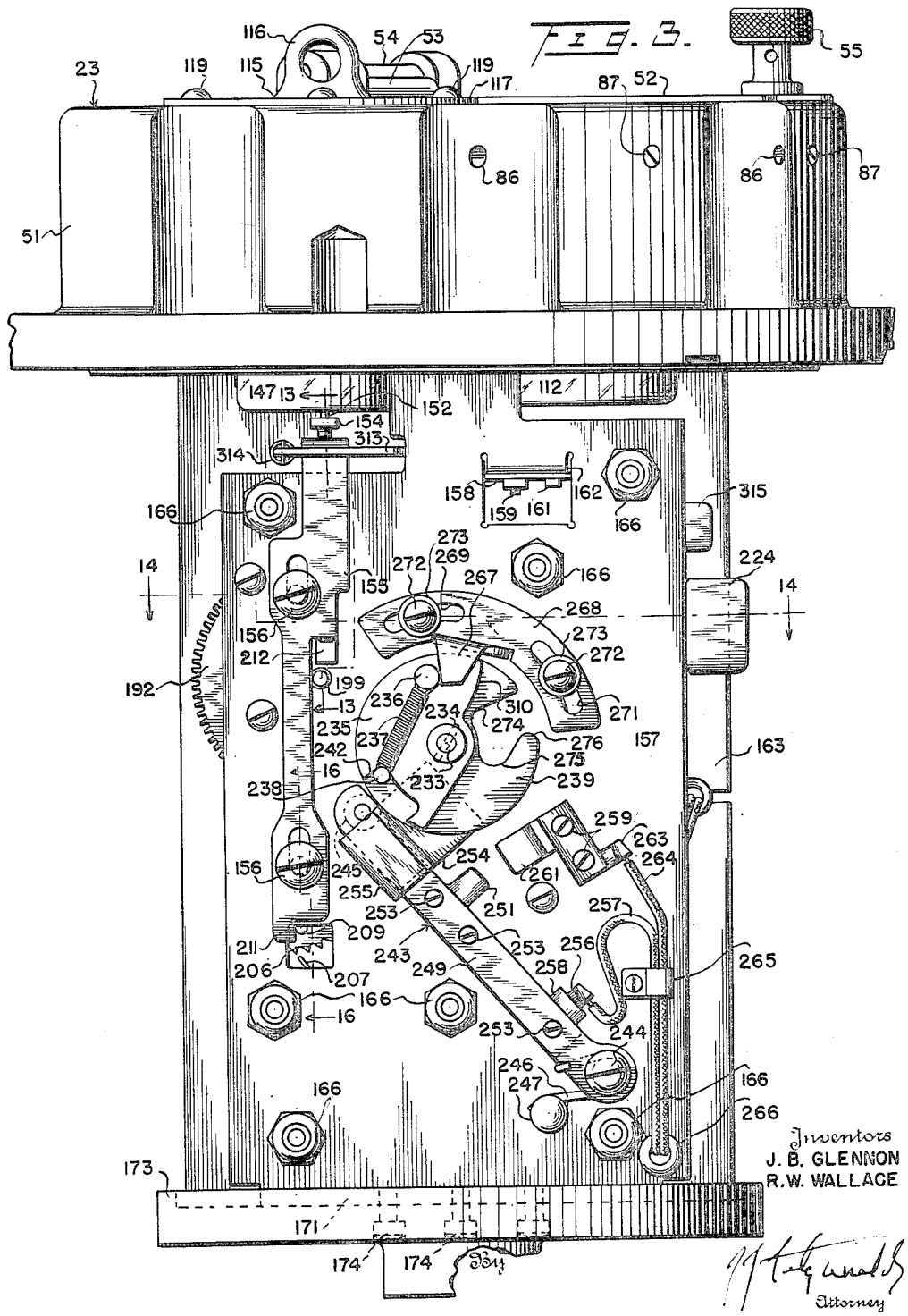
Fig. 3 is a greatly enlarged view of the device as seen from the reverse side of Fig. 2.

There is also provided an adjustable screw 154 in substantial abutting relation with respect to the lower end of the plunger rod 125 at the reduced portion 152 thereof, the screw being in threaded engagement with the upper end of a starting element 155, Figs. 3 and 8, slidably supported as by the screws 156 on a plate 157 and yieldably maintained in the raised or initial position thereof by a resilient spring 158 secured to the plate as by screws 159 and 161, the plate having a bent over portion 162 adapted to receive the screws and support the spring in the position shown on the drawings. The plate 157 is clamped to the plate 163 by a plurality of spacing members or studs 164, the stud 165 and nuts 166 threaded thereon, the plates 157 and 163 being preferably formed as at 167 and 168 respectively and secured to the cap 51 as by the screws 169. The lower ends of the plates 157 and 163 are formed as at 171 and 172 respectively and secured to a circular support 173 as by the screws 174. There is also provided a plate 175 secured to the plate 157 in space relation with respect thereto as by the spacing members 176 and 177 and the nuts and screws respectively associated therewith.

The circular support 173 is provided with a centrally arranged aperture within which is disposed a tubular member 178 secured to the circular support as by the screws 179 and to the plate 163 as by the screws 181, Fig. 9. Slidably arranged within the member 178 is a plunger 182, Fig. 7, adapted to support an electro-responsive detonating device 183 having a pair of flexible conductors 184 connected thereto and passing through a slot 185 within the tubular member 178 thereby to maintain a continuous external connection to the detonator without interfering with the movement of the detonator in either direction between the retracted position and the extended position thereof. The plunger 182 may be composed of any suitable material such, for example, as aluminum and provided preferably with a pair of sleeves 186 of material suitable for the purpose such, for example, as brass secured thereto thereby to facilitate the movement of the plunger within the tubular member 178. The member 178 is also provided with a plurality of apertures 187 thereby to dissipate the force of the explosion in the event that the detonator should, for any reason, be prematurely fired before being moved to the extended position and thus the force of the explosion would be ineffective to explode the mine prematurely.

Figure 7:
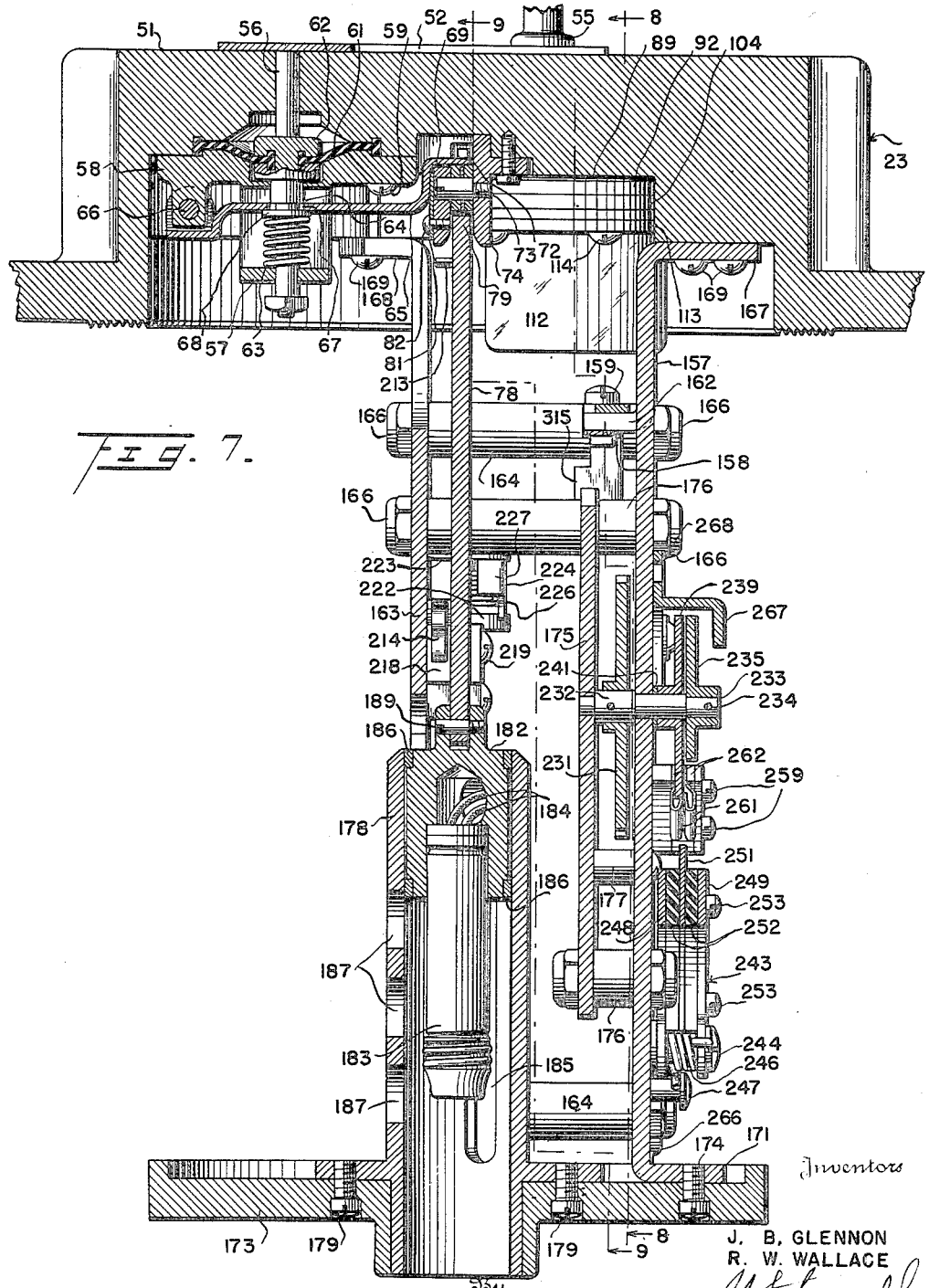
Fig. 7 is a sectional view taken substantially along the line 7—7 of Fig. 4.
Figure 14:
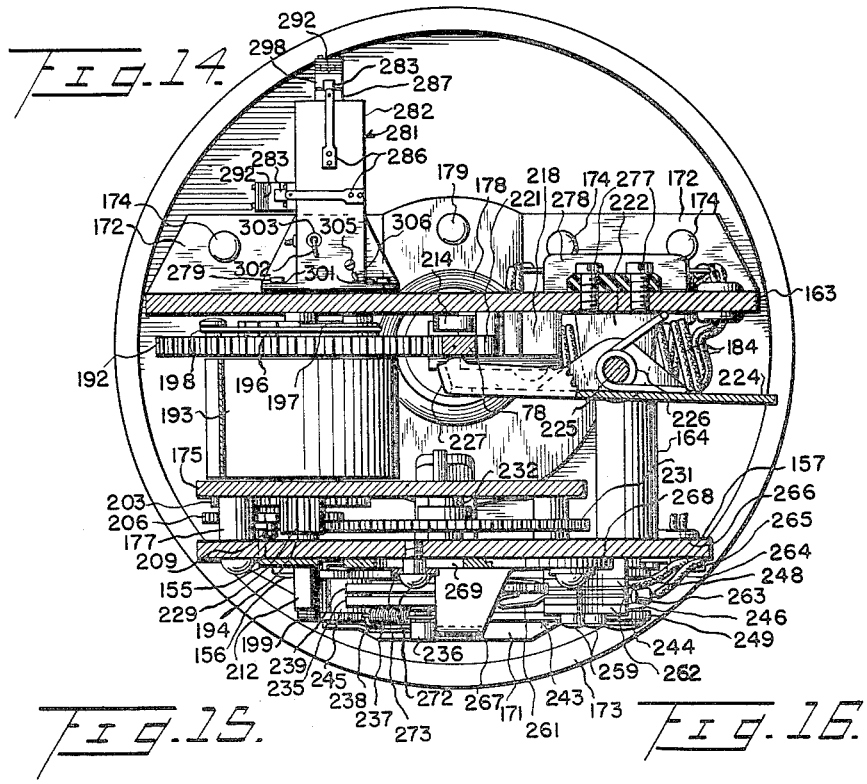
Fig. 14 is a sectional view taken along the line 14—14 of Fig. 3.

The upper end of the plunger 182 is pivotally secured to a rack 78 as by the bearing screw 189, Fig. 7, passing through the rack and through a bifurcated portion of the plunger. The upper end of the rack, as heretofore stated, is adapted to be locked to the cap 51 until the detachable bar 52 has been moved to a released position.

The rack 78 is provided with a plurality of teeth 191, Fig. 9, in meshed engagement with the gear 192 adapted to be actuated by the spring 193 secured at one end to the shaft 194 and at the other end thereof to the stud 165 at the reduced portion 195 thereof. There is secured to the shaft 194 a ratchet wheel 196 having a plurality of teeth adapted to be engaged by the pawls 197, Fig. 10, pivotally secured to the gear wheel 192 and urged toward the ratchet wheel by the springs 198. The shaft 194 is rotatably supported by the plates 157 and 163 and provided with a threaded portion 199, Fig. 13, adapted to receive a winding crank or key. The gear 192 is also in meshed engagement with a gear 201 secured to the shaft 202, Fig. 16, having a substantially larger gear 203 rotatably mounted thereon, and provided with a pair of pawls 204 adapted to engage the ratchet wheel 205 secured to the shaft 202. The gear 203 is in meshed engagement with a gear 200 secured in any suitable manner to a shaft 210 having an escapement wheel 206 secured thereto and rotatably supported by the plates 157 and 175. The escapement wheel is adapted to actuate an escapement device 207 operatively connected thereto and adapted to be oscillated as the gears rotate. The escapement gear 206 is provided with a pair of stop pins 208 and 209 adapted to be engaged by the lower end 211 of the starting element 155 and thereby prevent the escapement mechanism from being set into operation until the element 155 has been moved out of the path of travel of the pins 208 and 209 by the resilient spring 141 of the master switch mechanism. The starting element 155 is also provided with a projecting portion 212, Fig. 3, adapted to be moved substantially into alinement with the axis of the shaft 194 and thereby prevent the winding key from being connected thereto until the starting element 155 has been restored to the initial position during the assembly and test of the device, as will more clearly appear as the description proceeds.

The rack member 78 is provided at the upper end thereof with a pin 213 affixed thereto and adapted to be brought into engagement with a resilient spring 214, Fig. 9, secured to the plate 163 as by the screws 215 whereby the rack is automatically moved out of engagement with the teeth of the gear 192 as the rack moves into a position corresponding to the extended position of the detonator. When this occurs, a shoulder 216 on the rack member is brought into engagement with a projecting portion 217 of the member 218 secured to the plate 163 as by the screws 219, the member 218 having a slotted portion 220 therein within which the rack is adapted to move, a roller 221 being preferably provided to facilitate the movement of the rack member 78.

Figures 15, 16:
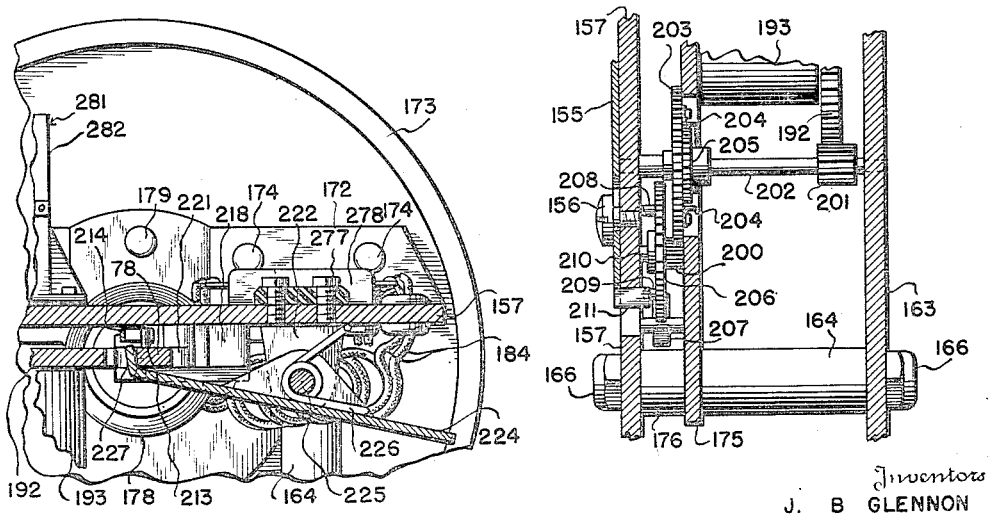
Fig. 15 is a fragmentary view similar to Fig. 14 showing the rack bar in a locked position and disengaged from the operating mechanism therefor.
Fig. 16 is a fragmentary sectional view taken substantially along the line 16—16 of Fig. 3 showing a portion of the clock starting and escapement mechanism.

The plate 163 is formed as at 222 and 223 thereby to support a lever 224 pivotally secured thereto as by the bearing screw 225, a spring 226 being provided to urge the formed end 227, Fig. 15, of the lever against the rack 78. The end 227 of the lever arm 224, it will be noted, is formed at an angle with respect to the rack 78 whereby the arm 224 additionally urges the rack away from the gear 92 as the formed end 227 of the lever arm moves to the position shown on Fig. 15. As the rack is moved by the spring 214 into locking engagement with the member 218 and the formed end 227 of the lever 224 moves into the position shown on Fig. 15, the disengagement of the shoulder 216 of the rack from the projecting portion 217 of the member 218 is prevented until the lever 224 is operated by the key member of Fig. 42. The rack is thus locked in the fully extended position of the detonator such that the geared connection between the rack and the gear wheel 192 is interrupted, the escapement mechanism including the gear 192 continuing to operate after the detonator has been fully extended until the arming contacts controlled by the escapement mechanism are moved into locked engagement with each other, as will more clearly appear as the description proceeds. The arm 224, it will be noted, is provided with an enlarged end and a plurality of apertures 228 thereby to effect a kinetic balance of the arm such that the arm is not actuated by the shock of impact received at the time of launching the mine.

The shaft 194 is provided with a gear 229, Fig. 8, secured thereto in mesh with a gear 231 affixed to a shaft 232 journaled within the plates 157 and 175 and having an extended portion 233, Fig. 7, to which is affixed as by the pin 234, the member 235 having a pin 236, Fig. 3, projecting therefrom to which is secured one end of a retractile spring 237. The other end of the retractile spring is attached to a pin 238 secured to the member 239 rotatably mounted upon the extended portion of the shaft 232, a washer 241, Fig. 7, preferably being arranged between the member 239 and the plate 157 thereby providing an arrangement in which the pin 238 is maintained in engagement with the end 242 of a recessed portion of the member 235 when the device is set to an initial starting position. The members 235 and 239 are generally circular with the circumferential portion of the members in substantial coaxial alinement with each other. The contact arm indicated generally by the numeral 243 is pivotally mounted as by the bearing screw 244 and provided with a roller 245 at the opposite end thereof continuously urged into engagement with the member 239 by a suitable resilient spring such, for example, as the spring 246 arranged about the bearing screw 244 and having one end thereof in engagement with a pin or stud 247 affixed to the plate 157. The contact arm 243 is composed preferably of two bars 248 and 249, Fig. 7, having a switch element 251 arranged intermediate the bars and insulated therefrom as by the pair of insulating devices 252. The bars 248 and 249 are clamped together as by the screws 253 thereby providing a contact assembly adapted to be pivoted about the bearing screw 244 selectively in accordance with the setting of the member 235 affixed to the shaft 232.

The contact arm 243 is prevented from substantial movement away from the member 239 with the member 239 in an initial starting position by the stop device 254 secured in any suitable manner to the plate 157 and preferably formed as at 255 thereby to guide the arm 243 and prevent damage or injury thereto as the result of the shock of impact as the mine is launched. The switch element 251 is provided with a tab or terminal 256 having a flexible conductor 257 secured thereto by means of which an external circuit connection to the switch element is established. The insulating devices 252 are preferably provided with extending portions 258 thereby to prevent the possibility of electrical contact between the conductor 257 and the bars 248 and 249. There is also secured to the plate 157 as by the screws 259 a pair of contact springs 261 adapted to be engaged by the switch element 251 as the switch moves to the closed position thereof, the contact springs being electrically insulated from the plate 157 as by the insulators 262. The contact springs are provided with a tab or terminal connection 263 to which is connected the conductor 264 for establishing an external circuit connection to the contact springs. The conductors 257 and 264 are preferably secured to the plate 157 as by the clamp 265, the conductors thereafter continuing through the insulating devices 266 arranged within suitable apertures in the plates 157 and 163.

The pin 236 affixed to the member 235 is normally in engagement with a back stop 267 having an arcuate portion 268 with arcuately shaped slots 269 and 271 therein within which the screws 272 are arranged, washers 273 being preferably disposed between the screw heads and the stop member. An arrangement is thus provided in which the initial or starting position of the member 235 may be adjusted at will thereby to vary the interval of time between the starting of the escapement mechanism and the closure of the switch 251. The member 239 is provided with a recessed portion 274 whereby the roller 245 is caused to move quickly toward the extending portion 233 of the shaft 232 as the recessed portion 274 is moved into juxtaposition with the roller thereby closing the switch 251. The escapement mechanism, however, continues to operate until arrested by the arcuate portion 275 of the member 239 moving into engagement with the roller 245, at which time the escapement mechanism is brought to rest by the contact arm 243, the contact arm being locked in the closed position by the hooked portion 276 of the member 239.

Figure 2:
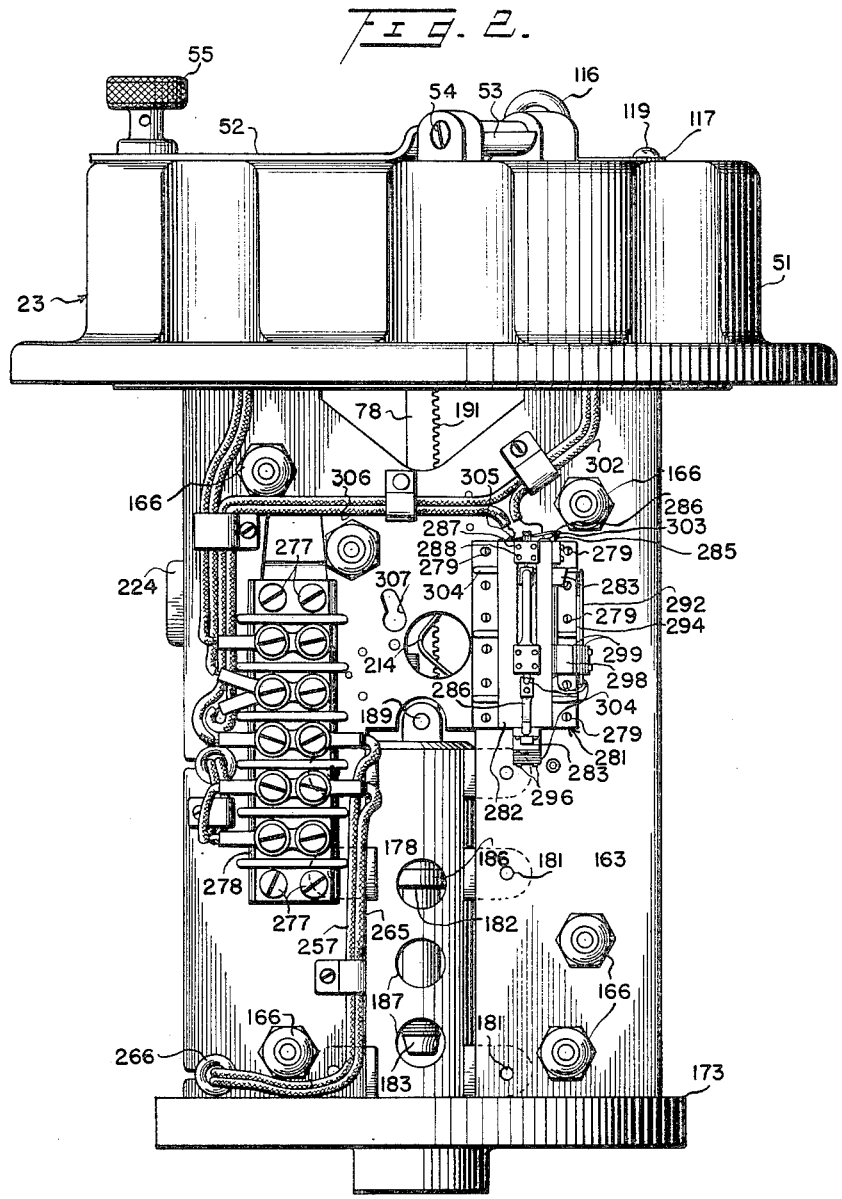
Fig. 2 is an enlarged view in elevation of the device of Fig. 1.

Secured to the plate 163 as by the screws 277 is a terminal block 278, Fig. 2, having a plurality of screw terminals thereon for establishing electrical connections to the master switch, the hydrostat switch, the arming switch contacts, battery 36 and the firing mechanism 37. There is also secured to the plate 163 as by the screws 279 an inertia switch 281 comprising a casing 282 having a plurality of inertia members respectively arranged on each of three sides of the casing such that each of the inertia members is substantially at a right angle with respect to the other inertia members. The inertia members are substantially identical in construction and it is thought, therefore, that a detailed description of one of the inertia members only is sufficient for a full and complete understanding of the inertia switch herein disclosed. Each of the inertia members comprises a mass of metal 283 secured to one end of a resilient member or spring 284 having the other end thereof clamped to the casing 282, the mass 283 and the spring 284 being arranged within a suitable aperture within the casing whereby the mass 283 is adapted to be deflected from an initial position variably in accordance with the degree of shock or deceleration to which the mine is subjected. The end of the mass is preferably formed arcuately whereby substantial movement of a lock pin or plunger 285 is prevented until the mass is moved through a distance corresponding to a predetermined angle such, for example, as the distance through which the mass moves when the mine strikes terra firma or the surface of a body of water, as the case may be. When this occurs, the lock pin 285 is actuated by the resilient spring 286 slideably within the member 287 secured to the casing 282 as by the screws 288 within the path of travel of the mass thereby locking the mass in a predetermined moved position. As the mass moves into the predetermined moved position it engages the contact 289 or 291, as the case may be, secured to the contact springs 292 and 293 respectively thereby establishing a circuit between the engaged contact spring and the casing 282. If desired, the contact surfaces of the mass 283 may be made of precious metal known in the art as contact metal or electrical contacts may be secured to the mass 283 for selective engagement with the contacts 289 and 291.

The contact springs 292 and 293 are provided with back stop springs 294 and 295 respectively against which the contact springs normally rest thereby providing an arrangement in which a substantial degree of pressure is established at the contacts 289 and 291 immediately upon engagement of the contacts with the mass 283. The arrangement of parts and the contsruction of the various elements are such that the contact springs are disengaged from their respective back stops and the contacts thereof are in engagement with the mass selectively when the mass is locked in either of the closed positions thereof by the lock pin 285. The contact spring assemblies and the resilient member 284 may be secured to the casing 282 in any convenient manner such, for example, as by the screws 296 and nuts 297 thereon and the spacing bushings 298 and bushings 299 of suitable insulating material arranged in the manner shown on Figs. 39 to 41 of the drawings whereby the contact springs are arranged in predetermined space relation with respect to the mass 283 and insulated from the casing 282.

The casing 282 is insulated from the plate 157 by a sheet or strip of insulating material 300 arranged therebetween and the insulating washers 301 disposed beneath the heads of the screws 279. The contact springs 292 and 293 associated with each of the inertia members are in electrical connection with each other and with the conductor 302 extending to the master switch, suitable insulating sleeves such as the sleeves 303 illustrated being provided within the casing 282 and having an electrical conductor therein to facilitate the aforesaid electrical connection. The casing 282 may be provided with a plurality of ribs 304, if desired, thereby to prevent damage to the casing or a change in the adjustment of the various switch elements as the result of the shock received during the planting of the mine. The casing 282 is also provided with a screw terminal 305 in electrical connection with the conductor 306 extending by way of the terminal block 278 to the hydrostat switch mechanism.

Certain features of construction and arrangement of parts have been provided to facilitate the restoration of the detonator extending and arming device to the initial starting position thereof when a cycle of operations has been completed whereby the device may be cycled repeatedly as many times as may be desired during the construction and test of the device.

The special features of construction and instrumentalities provided for this purpose will now be described. A key such, for example, as the key illustrated on Fig. 42, is inserted within the keyhole 307 within the plate 163 until the shoulder 308 thereof comes into contact with the plate 163. When this occurs, the end 309 of the key is rotatably supported by a suitable bearing within the plate 175. As the key is inserted within the keyhole 307, a shoulder 311 thereon engages the lever 224, Fig. 9, thereby moving the lever out of locking engagement with the rack 78. As the key is rotated, the projecting portion 312 thereof causes the rack member 78 to be pivoted about the bearing support 189 out of locking engagement wtih the projecting portion 217 of the member 218 and into engagement with the gear wheel 192. The detonator and supporting plunger thereof may now be moved to the initial retracted position by reason of the provision of the pawls 204 and ratchet wheel 205 on the shaft 202 and locked therein by the bar 52 and safety screw 55.

A lever arm 313, Figs. 3 and 8, is pivotally mounted as by the screw 159 and urged by a spring 314 secured thereto and to the plate 163 into engagement with the upper end of the starting element 155 whereby, as the starting element is moved to the starting position, the lever 313 is moved by the spring 314 to a locking position in abutting relation with respect to the upper end of the starting element thereby locking the starting element in the operated position. When it is desired to rewind the spring 193 of the escapement and arming mechanism, the master switch is moved to the position shown on Fig. 8 and the arming plug 115 is clamped in the assembled position by the retaining ring 117 and the lever arm 313 is moved manually by means of the projecting portion 315 thereof out of the path of travel of the starting member 155 and the starting member is moved to the initial position by the spring 158 while the lever 313 is thus moved. The lever 313 may now be released and the spring 193 may be wound by attaching a suitable winding key or crank to the shaft 194.

As the shaft 194 is rotated by the winding key during the winding operation, the arcuate portion 275 of the member 239, Fig. 3, is moved by the spring 237 away from the roller 245 and the member 239 is momentarily arrested by the roller as the member 235 continues to move in response to the continued winding of the spring 193. When this occurs, the member 235 moves relative to the member 239 until the curved cam portion 310 of the member 235 engages the roller 245. Continued movement of the member 235 causes the roller to be forced outward by pressure applied to the cam surface 310 until the roller and arm 243 have been moved to the initial or unoperated position shown on Fig. 3 of the drawings. When this occurs, the rotatable member 239 is released from the roller and moved quickly by the spring 237 to a position such that the pin 238 secured thereto again engages the end 242 of the recessed portion within the member 235 at which time the members 235 and 239 are rotated as a unit until the pin 236 engages the back stop 267 and the device is in readiness for another cycle of operations.

The operation of the device will best be understood by consideration of Fig. 43 of the drawings on which is shown in diagrammatic form the complete system. Let it be assumed, by way of example, that the mine is loaded within a rack secured to an aircraft, an arming wire has been attached to the plug 115, and the safety screw 55 has been removed, the bar 52 being held at this time by a projecting portion of the rack within which the mine rests. As the mine is released from the aircraft in flight, the bar 52 is disengaged thereby causing the plunger 56 to be released. The release of the plunger 56 unlocks the rack member 78 for movement from the retracted position thereof.

As the mine continues to fall away from the aircraft the arming wire jerks the plug 115 sufficiently to bend the projecting portions 118 of the retaining ring 117 sufficiently for the plug to be disengaged from the cap 51. The plunger 125 is now released for operation and caused to be moved downwardly by the spring 141 until the contacts 135 of the master switch are moved into engagement with the contact ring 136, the movement of the plunger 125 also causing the starting element 155 to be moved to the starting position thereby setting the escapement mechanism into operation. The operation of the escapement mechanism causes the detonator 183 to be moved to the extended position within the booster charge 27 whereupon the rack member 78 is disconnected from the gear 192 and locked in the extended position. The escapement mechanism, however, continues to operate until the arming switch 251 has moved to the closed position and been locked therein by the arcuate portion 275 of the member 239.

As the mine strikes the surface of the water the inertia switch is operated thereby completing a circuit by way of contacts 289 or 291 of at least one of the inertia elements from the closed contacts 135 of the master switch to the contact ring 103 of the hydrostat switch. The hydrostat switch, however, is opened by the pressure of the water before the arming switch 251 is moved to closed position and the operation of the inertia switch, therefore, at this time performs no useful function.

When the mine has descended within the water to a predetermined depth of submersion, the contacts 102 of the hydrostat switch are disengaged from the contact ring 103 thereby interrupting the circuit to the inertia switch. The arming switch 251, it will be understood, is delayed sufficiently by the member 239 to prevent the closure of the arming switch until sufficient time has elapsed for the mine to come to rest on the bed of a body of water within which the mine is launched.

As the arming switch 251 moves into the closed position a circuit is closed from the positive terminal of battery 36, conductor 257, contacts 251 and 261 of the arming switch, conductor 264, winding of the slow operating relay SO from whence the circuit is continued by way of conductor 316 to the contacts of the firing relay FR, a circuit also being closed from battery by way of conductor 264, slow acting fuse F, conductor 317, winding of the reset magnet R of the firing relay FR, conductor 318 and thence to the negative terminal of battery 36. The relay FR is a sensitive relay having an operating winding W adapted to be energized by an electromotive force generated in the induction coil 38 by a predetermined change in the magnetic field adjacent thereto. The energization of the reset magnet R of relay FR causes the contact element 319 thereof to be moved to a neutral position intermediate the relay contacts 320 and 321. As the fuse F operates in response to the flow of current therethrough, the circuit to the reset magnet R is interrupted and the contact element 319 is in readiness for operation in response to signals received from the induction coil 38.

Let it now be assumed that a steel vessel approaches sufficiently close to the mine to cause a change in the magnetic field adjacent the coil 38 sufficient to move the armature 319 of relay FR into circuit closing position. A circuit is now closed from positive battery by way of conductor 257, switch contacts 251 and 261, conductor 264, winding of relay SO, conductor 316, contact 320 or 321, as the case may be, and contact member 319 of relay FR, conductor 318 and thence to the negative terminal of battery 36 thereby causing relay SO to operate. Relay SO is a slow operating relay by reason of the provision of a copper slug about the core of the electromagnet or by reason of a dash pot or other suitable time delay mechanism controlled thereby and the relay armature, therefore, does not move into circuit closing position until a predetermined period of time has elapsed after the operating magnet has been energized. When this occurs, a circuit is closed from negative battery by way of conductor 318, make contact and armature 322 of relay SO, conductor 323, contacts 135 and 136 of the master switch MS, conductor 324, detonator 183, conductor 264, contacts 261 and 251 of the arming switch, conductor 257 and thence to positive battery thereby firing the detonator and exploding the mine under a vulnerable portion of the vessel by reason of the delayed action of the relay SO.

In the event that the mine, when dropped from the aircraft, landed upon terra firma or upon the surface of a body of water of insufficient depth to cause the hydrostat switch HS to operate and the contacts 102 and 103 thereof to be actuated to the open position, the mine is fired as the contact 251 of the arming switch moves into engagement with the contact 261 in the following manner: The shock of impact of the mine against terra firma or the surface of the body of water, as the case may be, causes the mass of metal 283 of at least one of the elements of the inertia switch to be locked in circuit closing position in contact with the associated contact element 289 or 291 thereby electrically connecting the conductors 302 and 306 extending to the contact elements of the master switch and hydrostat switch respectively. When sufficient time has elapsed for the arming switch to be moved to the closed position, a circuit is closed from positive terminal of battery 36 by way of conductor 257, contacts 251 and 261 of the arming switch, conductor 264, detonator 183, conductor 324, contacts 136 and 135 of the master switch MS, conductor 302, contacts 289 or 291 of the inertia switch, as the case may be, conductor 306, contacts 103 and 102 of the hydrostat switch HS, conductor 325 and thence to the negative terminal of battery 36 thereby operating the detonator and exploding the mine as the arming switch 251 moves into the closed position.

By providing an inertia switch in the manner here disclosed of the type adapted to close the switch contacts only in response to a blow or shock of great intensity such, for example, as the shock received when the mine is dropped from an aircraft on terra firma or the surface of a body of water and which is not adapted to close the contacts in response to shocks of lesser violence such, for example, as the shocks received by the mine during the handling and transportation thereof, there is no possibility of premature detonation of the mine as the result of the removal of the plug 115 or the bar 52 therefrom prior to the release of the mine from the aircraft in flight.

Furthermore, in the event that the mine should be raised by unauthorized persons toward the surface of the body of water within which the mine has been planted or the mine should be moved into sufficiently shallow water by the action of tidal currents, storms and the like of insufficient depth to maintain the contacts of the hydrostat switch open, the closure of the hydrostat switch contacts in response to the reduction in pressure of the water within the chamber 85 closes a circuit from the positive terminal of battery 36 by way of conductor 257, contacts 251 and 261 of the arming switch, conductor 264, detonating device 183, conductor 324, contacts 136 and 135 of the master switch MS, conductor 302, closed contacts of the inertia switch, conductor 306, contacts 103 and 102 of the hydrostat switch HS, conductor 325 and thence to the negative terminal of battery 36 thereby operating the detonator and exploding the mine. An arrangement is thus provided in which the mine is adapted to be self-destructive in the event that the enemy attempts to recover the mine from the body of water within which the mine is planted or the mine is moved into shallow water of less than a predetermined depth.

Briefly stated in summary, the present invention contemplates the provision of new and improved mechanism for arming a mine in which the detonating element is caused to be extended within an explosive charge in response to the release of the mine from an aircraft in flight and in which the mine is armed by the closure of an arming switch actuated by the mechanism employed for extending the detonator in time delayed relation with respect to the movement of the detonator to the extended position and in which the detonator is locked in both the retracted position and in the extended position, the arming switch also being locked in both the initial open position and the operated closed position thereof, in which new and improved means are employed for preventing the premature detonation of the mine prior to the release thereof from the aircraft, and in which means are provided for firing the mine in the event that the mine lands on terra firma or within a body of water of less than a predetermined depth.

While the invention has been described with respect to a particular example thereof which gives satisfactory results, it will be understood by those skilled in the art to which the invention pertains, after understanding the invention, that various changes and modifications may be employed without departing from the spirit and scope of the invention and it is our intention, therefore, in the appended claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. A device of the character disclosed for arming a submarine mine adapted to be released from an aircraft in flight, a movable electro-responsive detonator, a source of energy, means for causing said detonator to be actuated by said source of energy from an initial retracted position to an extended position, means effective when the detonator has been actuated to said extended position for disconnecting the detonator actuating means from said source of energy, and a circuit closing device electrically connected to said detonator and adapted to be moved to circuit closing position when a predetermined period of time has elapsed after the detonator has been actuated to said extended position.

2. In an arming device of the character disclosed for a submarine mine adapted to be released from an aircraft in flight, a movable electro-responsive detonating device, time measuring means detachably connected to the detonating device for actuating said detonating device from an initial retracted position to an extended position as the mine falls away from the aircraft, means for disconnecting said time measuring means from said detonating device as the detonating device is moved into said extended position, an arming circuit including said detonating device, and means controlled by said actuating means for closing said arming circuit in predetermined time delayed relation with respect to the actuation of the detonating means to said extended position.

3. Arming mechanism for a marine mine adapted to perform a cycle of operations in response to the release of the mine from an attacking craft, a detonating device adapted to be moved from an initial locked position to an extended position, means for releasably locking the detonating device in said initial position, means including a movable member in normal engagement with the craft for releasing said locking means as the mine falls away from the craft, means including a member adapted to be detached from the arming mechanism as the mine is released from the craft for causing the arming mechanism to perform a cycle of operations, means for actuating the detonating device from the initial position to the extended position during said cycle of operations, means for locking the detonating device in the extended position, and means controlled by said actuating means for arming the mine in time delayed relation with respect to the locking of the detonating device in said extended position.

4. An arming device of the character disclosed for a submarine mine adapted to be released from an aircraft in flight, a spring driven mechanism within the device, means for setting the spring driven mechanism in operation as the mine falls away from the aircraft, a detonating device, means including a rack member operatively connected to said spring driven mechanism for moving the detonating device to an extended position, means for disengaging said rack member from the spring driven mechanism as the detonating device is moved into said extended position, means for locking the detonating device in the extended position, an arming circuit, and means controlled by the spring driven mechanism for closing said arming circuit when a predetermined period of time has elapsed after the detonating device has been locked in said extended position.

5. A device of the character disclosed for arming a submarine mine adapted to be released from an aircraft in flight, a detonating device adapted to be moved from an initial position to an extended position, a source of power, means for causing the detonating device to be moved by said source of power from said initial position to the armed position as the mine falls away from the aircraft, means for locking the detonating device in said extended position, and means actuated by said source of power for arming the mine in predetermined time delayed relation with respect to the locking of the detonating device in said extended position.

6. An arming device for a submarine mine adapted to be released from an aircraft in flight, a motor driven mechanism comprising a plurality of operatively connected shafts, a detonating device, means controlled by one of said shafts for moving said detonating device to an extended position as the mechanism operates, an arming circuit, means controlled by a cam member arranged on another of said shafts for closing said arming circuit when a predetermined period of time has elapsed after the detonating device has been moved to said extended position, and means for setting said mechanism in operation as the mine is released from the aircraft.

7. A device of the character disclosed for arming a submarine mine adapted to be released from an aircraft in flight, a detonating device, releasably locked means including a motor for actuating said detonating device to an extended position, a detachable plug adapted to be removed from said arming device as the mine falls away from the aircraft, and means including a plurality of spring pressed plungers adapted to be released as the plug is removed from the arming device for releasing said actuating means.

8. A device of the character disclosed for arming a marine mine adapted to be released from an aircraft in flight, a movable detonating device, a source of power operatively connected to said detonating device and adapted to move the detonating device to an extended position, means for causing the detonating device to be moved to said extended position by said source of power as the mine falls away from the aircraft, a cam member adapted to be rotated by said source of power concurrently with the movement of the detonating device to said extended position and for a predetermined period of time thereafter, and a switch arm having a cam follower thereon adapted to be moved to closed position when the cam has rotated through a predetermined angle.

9. A device of the character disclosed for arming a marine mine adapted to be released from an aircraft in flight, a movable detonating device, a source of power operatively connected to said detonating device and adapted to move the detonating device to an extended position, means for causing the detonating device to be moved to said extended position by said source of power as the mine falls away from the aircraft, a cam member adapted to be rotated by said source of power concurrently with the movement of the detonating device to said extended position and for a predetermined period of time thereafter, a switch arm having a cam follower thereon adapted to be moved to closed position when the cam has rotated through a predetermined angle, and means controlled by said cam for locking the switch arm in said closed position when the cam has moved through a predetermined additional angle.

10. A device of the character disclosed for arming a submarine mine adapted to be launched from an attacking craft, a source of stored energy, means including a train of gears for causing a fractional part of said stored energy to be released at a predetermined rate, a detonating device, means adapted to be operated by said source of stored energy for moving the detonating device to an extended position, a normally open switch element, a cam member adapted to be actuated during the release of said fractional part of the stored energy having means for closing said switch element when the cam member is actuated to a predetermined position, and means settable at will for varying the degree of movement of said cam until the cam is actuated to said predetermined position.

11. A device of the character disclosed for arming a submarine mine adapted to be released from an aircraft in flight, a casing for said mine, an explosive charge arranged within said casing, a releasably locked detonating device, means responsive to the release of the mine from the aircraft for unlocking said detonating device, actuating mechanism adapted to move the detonating device to an extended position in operative relation with respect to said explosive charge as the detonating device is unlocked, a slidable plunger adapted to be operated as the mine falls away from the aircraft, means for operating said plunger, and means controlled by the plunger for setting said detonator actuating mechanism in operation.

12. A submarine mine of the character disclosed adapted to be released from an aircraft in flight, an explosive charge arranged within said mine, a detonating device, means for extending said detonating device within the explosive charge as the mine falls away from the aircraft, a source of electrical power, an arming switch adapted to connect said detonating device to one terminal of said source of electrical power when sufficient time has elapsed for the mine to come to rest on the bed of a body of water, means for operating said arming switch, a firing circuit having means adapted to connect the detonating device to the other terminal of the source of electrical power, and a hydrostatically controlled switch adapted to render said firing circuit ineffective when the mine reaches a predetermined depth of submersion within the water.

13. In an arming and firing mechanism for a submarine mine adapted to be released from an aircraft in flight, the combination of electro-responsive detonating means, a source of electrical power, a normally open first switch element adapted to be closed as the mine is released from the aircraft, a second switch element adapted to be closed in time delayed relation with respect to the closure of said first switch element, a hydrostatically controlled switch having a pair of normally closed contacts adapted to be opened by a predetermined degree of pressure of the water within which the mine is planted, a firing circuit including said source of electrical power, said first and second switch elements, the hydrostat switch, and the electro-responsive detonating device arranged in series connection, and an inertia switch included within said firing circuit having a plurality of normally open contact elements for rendering the firing circuit ineffective until the mine has been subjected to a mechanical shock of predetermined intensity.

14. A submarine mine adapted to be released from an aircraft in flight, an explosive charge arranged within said mine, means for detonating said explosive charge, a firing circuit having a source of electrical power therein, means responsive to the release of the mine from the aircraft for closing said firing circuit in part as the mine falls away from the aircraft, an inertia switch having a plurality of normally open contacts adapted to be closed by the shock of impact of the mine against terra firma when dropped from said aircraft and thereby additionally close said firing circuit, and means effective when the contacts of the inertia switch are closed for completely closing said firing circuit within a predetermined period of time after the mine has been released from the aircraft thereby to operate the detonating means by said source of electrical power.

15. In an arming and firing device for a submarine mine adapted to be released from an aircraft in flight, the combination of an explosive charge arranged within the mine, detonating means for firing said explosive charge, a source of electrical power, a master switch having a pair of contacts adapted to be closed as the mine is released from the aircraft, an inertia switch adapted to be closed as the mine strikes the surface of a body of water, a normally open arming switch, means for closing said arming switch within a predetermined period of time after the mine has been released from said aircraft sufficient for the mine to come to rest on the bed of the body of water, a firing circuit including said source of electrical power, the contacts of said master switch, said inertia switch, said detonating means and said arming switch, and hydrostat switch included within said firing circuit adapted to render the firing circuit ineffective as the mine reaches a predetermined degree of submersion within the water and thereby prevent the firing of said explosive charge by said detonating means as the arming switch is closed.

16. An arming device of the character disclosed for a submarine mine adapted to be released from an aircraft in flight, a spring driven mechanism within the device, means for setting the spring driven mechanism in operation as the mine falls away from the aircraft, a detonating device, means including a rack member operatively connected to said spring driven mechanism for moving the detonating device to an extended position, means for disengaging said rack member from the spring driven mechanism as the detonating device is moved into said extended position, means for latching the rack member in disengaged relation to said spring driven mechanism as the rack member is disengaged therefrom, and means including a pair of contact members adapted to be brought into electrical engagement with each other by said spring driven mechanism in time delayed relation with respect to the latching of said rack member for arming the mine when sufficient time has elapsed for the mine to come to rest on the bed of a body of water.

17. A device of the character disclosed for arming a submarine mine adapted to be released from an aircraft in flight, a movable detonating device, a source of power operatively connected to said detonating device and adapted to move the detonating device to an extended position, means for causing the detonating device to be moved to said extended position by said source of power as the mine falls away from the aircraft, a cam member adapted to be rotated by said source of power concurrently with the movement of the detonating device to said extended position and for a predetermined period of time thereafter, a switch arm having a cam follower thereon adapted to be moved quickly from an initial position to a closed position when the cam member has rotated through a predetermined angle, means controlled by said cam member for locking the switch arm in said closed position when the cam has moved through a predetermined additional angle, means including a second cam member adapted to be engaged by said cam follower and rotatable about an axis coincident with the axis of the first named cam member thereby to reset the switch arm to said initial open position as the second cam member is rotated reversely, and a flexible connection between said first and second cam members adapted to permit relative movement between the cam members during the reverse rotation of said second cam member.

18. In a submarine mine adapted to be released from an aircraft in flight, the combination of a detonating device, an explosive charge, spring driven means for extending the detonating device within said explosive charge as the mine falls away from the aircraft, an arming switch adapted to be closed by said spring driven means when a predetermined period of time has elapsed after the detonating device has been extended within the explosive charge, a firing relay, means including an induction pickup coil responsive to changes in the magnetic field adjacent the mine for operating said firing relay, and a firing circuit controlled jointly by the firing relay and said arming switch for causing the detonating device to fire the explosive charge selectively in accordance with the rate of change of said magnetic field.

19. In a submarine mine adapted to be released from an aircraft in flight, the combination of a detonating device, an explosive charge, spring driven means for extending the detonating device within said explosive charge as the mine falls away from the aircraft, an arming switch adapted to be closed by said spring driven means when a predetermined period of time has elapsed after the detonating device has been extended within the explosive charge, a sensitive relay having an induction pickup coil connected thereto adapted to operate the relay selectively in accordance with changes in the magnetic field adjacent the mine, means controlled by said arming switch for momentarily restoring the sensitive relay to a predetermined unoperated condition as the arming switch is closed, and means controlled jointly by said sensitive relay and the arming switch for causing the detonating device to fire the explosive charge in response to a predetermined rate of change of said magnetic field.

20. In an arming and firing mechanism for a submarine mine adapted to be released from an aircraft in flight, the combination of electro-responsive detonating means, a source of electrical power, a normally open first switch element adapted to be closed as the mine is released from the aircraft, a second switch element adapted to be closed in time delayed relation with respect to the closure of said first switch element, a hydrostatically controlled switch having a pair of normally closed contacts adapted to be disengaged by a predetermined degree of pressure of the water within which the mine is planted, a firing circuit including in series connection said source of electrical power, said first and second switch elements, said hydrostat switch, and the electro-responsive detonating device, an inertia switch having a plurality of pairs of normally open contact devices included within said firing circuit for rendering the firing circuit ineffective until the mine has received a mechanical shock of predetermined intensity, and a plurality of inertia elements respectively associated with each of said pairs of contact devices for engaging the contact devices when said mechanical shock is received, each of said inertia elements being adapted to move within a plane at a substantially right angle with respect to the planes in which the remaining inertia elements are adapted to move.

21. In a spring driven mechanism of the character disclosed for arming a submarine mine, the combination of a spring motor, means including a slideable bar having an initial position and a final position for setting said spring motor into operation as the bar is moved to the final position, means for moving said bar, a detonating device, means controlled by the spring motor for actuating the detonating device to an extended position, a pair of arming contacts adapted to be moved to a closed position in time delayed relation with respect to the movement of the detonating device to said extended position when the spring motor has made a predetermined number of revolutions, means for arresting the spring motor when the arming contacts have been moved to said closed position, detachable means for winding the spring motor, and means controlled by said slideable bar for preventing the spring motor from being wound by said winding means until the bar has been restored to said initial position.

22. In a device of the character disclosed for arming a submarine mine adapted to be released from an aircraft in flight, the combination of a movable detonating device, normally locked means for actuating said detonating device from an initial retracted position to an extended position as the actuating means is unlocked, a slideable releasably locked plunger, a resilient member for yieldably urging the plunger to a moved position, means effective as the mine falls away from the aircraft for releasing said plunger, an arming circuit, a pair of contact devices controlled by said plunger adapted to close in part said arming circuit as the plunger moves to said moved position, means including a slideable member in abutting relation with respect to said plunger for unlocking said actuating means thereby to cause the detonating device to be moved to the extended position in response to the movement of the plunger to said moved position, and means controlled by said actuating means for additionally closing said arming circuit in predetermined time delayed relation with respect to the movement of the detonating device to said extended position.

23. An arming device of the character disclosed for a marine mine adapted to be released from an aircraft in flight, an explosive charge arranged within the mine, a detonator adapted to explode said explosive charge, means including a spring motor for moving said detonator within the explosive charge as the mine falls away from the aircraft, an arming switch having an initial open position and a final closed position, means for locking the arming switch in said initial open position, a resilient member adapted to actuate the arming switch from the initial open position to the final closed position, a rotatable cam member actuated by said spring motor adapted to be continuously engaged by the arming switch, a recessed portion within said cam member adapted to cause the arming switch to be moved to said final closed position by said resilient member when the cam has moved through a predetermined angle in predetermined time delayed relation with respect to the movement of the detonator within said explosive charge, and means for locking the arming switch in said final closed position when the cam member has moved through a predetermined additional angle.

24. In an arming device of the character disclosed for a submarine mine adapted to be released from an aircraft in flight, time measuring means, a movable electro-responsive detonator operatively connected to said time measuring means for movement thereby from an initial retracted position to an extended position as the time measuring means operates, means for setting the time measuring means in operation as the mine falls away from the aircraft, means for disconnecting the detonator from the time measuring means as the detonator is moved into said extended position, an arming circuit including said detonator, and means driven by said time measuring means for closing said arming circuit in predetermined time delayed relation with respect to the movement of the detonator to said extended position.

25. In an arming device of the character disclosed for a submarine mine adapted to be released from an aircraft in flight, a movable electro-responsive detonator, a source of energy, means including a rack member operatively connected to said source of energy for causing said detonator to be actuated by said source of energy from an initial retracted position to an extended position, an arming circuit including said detonator, means for disengaging said rack member from said source of energy as said detonator is moved into said extended position, and means controlled by said actuating means and adapted to close said arming circuit when a predetermined period of time has elapsed after the detonator has been actuated to said extended position.

26. In an arming device of the character disclosed for a submarine mine adapted to be released from an aircraft in flight, a power source, a movable electro-responsive detonator means including a rack member operatively connected to said power source for moving said detonator from an initial retracted position to an extended position as the mine falls away from the aircraft, means for disengaging said rack member from said power source as said detonator is moved into said extended position, an arming circuit including said detonator, means operatively connected to said first named means for closing said arming circuit in time delayed relation with respect to the movement of the detonator to said extended position, and means settable at will for controlling the time delay between the movement of the detonator into the extended position thereof and the closing of the arming circuit.

27. In an arming and firing mechanism for a submarine mine having an explosive charge therein and adapted to be released from an aircraft in flight, the combination of a power source, an electro-responsive detonating means operatively connected to said power source for movement thereby from an initially retracted position to an extended position in firing relation with respect to said charge as the mine falls away from the aircraft, means for disengaging the detonating means from said power source as the detonating means is moved into said extended position, a firing circuit including said detonating means, and an inertia switch having at least one pair of normally open contact elements included within said firing circuit for rendering the firing circuit ineffective until the mine has been subjected to a mechanical shock of predetermined intensity.

28. In an arming and firing mechanism for a submarine mine adapted to be released from an aircraft in flight, the combination of a power source, an electro-responsive detonating means, means including a rack member operatively connected to said power source for moving said detonating means from an initially retracted position to an extended position as the mine falls away from the aircraft, means for disengaging said rack member from said power source as the detonating means is moved into said extended position, a firing circuit including said detonating means, an inertia switch having at least one pair of normally open contact elements included within said firing circuit for rendering the firing circuit ineffective until the mine has been subjected to a mechanical shock of predetermined intensity, an initially open switch means in the firing circuit and operatively connected to said power source for closing said switch means thereby in predetermined time delayed relation with respect to the release of the mine, and an initially closed hydrostatically responsive switch means arranged in series connection with said time delayed switch means for completely closing said firing circuit thereby to operate said detonating device when the pressure of the surrounding water is less than a predetermined value after said time delayed switch means is closed, said hydrostatically responsive switch means being adapted to be operated to open said firing circuit when the pressure of the surrounding water reaches said predetermined value.

29. In an arming device for an aerial launched submarine mine having a power source and a movable electroresponsive detonator therein comprising, in combination, means including a rack member operatively connected to said power source for moving said detonator from an initially retracted position to an extended position as the mine falls away from the aircraft, and means for disengaging said rack member from said power source as said detonator is moved into said extended position.

References Cited in the file of this patent

UNITED STATES PATENTS

| | | |
|---|---|---|
| 913,524 | Leon | Feb. 23, 1909 |
| 1,311,785 | Wildrick | July 29, 1919 |
| 1,382,374 | Maxim | June 21, 1921 |
| 1,407,653 | Hammond, Jr. | Feb. 21, 1922 |
| 1,418,606 | Swan | June 6, 1922 |
| 1,448,976 | Palmer | Mar. 20, 1923 |
| 2,060,205 | Hammond, Jr. | Nov. 10, 1936 |

FOREIGN PATENTS

| | | |
|---|---|---|
| 347,134 | Italy | Mar. 18, 1937 |